United States Patent
Sumanth et al.

(10) Patent No.: US 11,507,863 B2
(45) Date of Patent: Nov. 22, 2022

(54) FEATURE DETERMINATION FOR MACHINE LEARNING TO SUGGEST APPLICATIONS/RECIPIENTS

(71) Applicant: Apple Inc., Cupertino, CA (US)

(72) Inventors: Chiraag Sumanth, Mountain View, CA (US); Gokcen Cilingir, San Jose, CA (US); Joao Pedro Lacerda, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 377 days.

(21) Appl. No.: 16/880,408

(22) Filed: May 21, 2020

(65) Prior Publication Data
US 2021/0365806 A1   Nov. 25, 2021

(51) Int. Cl.
G06N 5/04 (2006.01)
G06N 20/00 (2019.01)
G06F 16/2457 (2019.01)

(52) U.S. Cl.
CPC ......... *G06N 5/04* (2013.01); *G06F 16/24575* (2019.01); *G06N 20/00* (2019.01)

(58) Field of Classification Search
CPC .. G06F 16/24575; G06N 20/00; G06N 20/20; G06N 5/003; G06N 5/04
See application file for complete search history.

(56) References Cited

U.S. PATENT DOCUMENTS

| | | | |
|---|---|---|---|
| 9,116,596 B2 | 8/2015 | Roman et al. | |
| 9,183,515 B2 | 11/2015 | Gundotra et al. | |
| 9,563,488 B2 | 2/2017 | Fadel et al. | |
| 10,356,020 B2 | 7/2019 | Chao et al. | |
| 10,817,791 B1* | 10/2020 | Shoemaker | G06F 21/316 |
| 10,846,612 B2* | 11/2020 | Keysers | G06N 5/04 |
| 2015/0081783 A1 | 3/2015 | Gong et al. | |
| 2015/0134389 A1* | 5/2015 | Punera | G06N 5/00 705/7.15 |
| 2015/0347200 A1 | 12/2015 | Fadel et al. | |
| 2017/0068906 A1 | 3/2017 | Korycki et al. | |

(Continued)

FOREIGN PATENT DOCUMENTS

| | | |
|---|---|---|
| CN | 105550933 A | 5/2016 |
| WO | 2015/182345 A1 | 3/2015 |
| WO | 2015/183456 A1 | 12/2015 |

OTHER PUBLICATIONS

Kim et al., "HIGH5: Promoting Interpersonal Hand-To-Hand Touch for Vibrant Workplace With Electrodermal Sensor Watches." *UbiComp '14*, Sep. 13-14, 2014, Seattle, WA, USA. ACM 978-1-4503-2968—Feb. 14 2009. 5 pages.

(Continued)

*Primary Examiner* — Kashif Siddiqui
(74) *Attorney, Agent, or Firm* — Kilpatrick Townsend & Stockton LLP

(57) ABSTRACT

Systems and methods can suggest applications for use by a user of a computing device. The suggestions can be provided on a user interface for the user to select. A suggestion engine can use historical user interactions and contextual data to derive features for a machine learning mode. The machine learning model can determine which application to suggest according to the current context. Multiple models, such as a pattern model and a heuristics model, may be user to generate features for the machine learning model based in user interactions.

20 Claims, 9 Drawing Sheets

(56) References Cited

U.S. PATENT DOCUMENTS

| | | | |
|---|---|---|---|
| 2017/0093774 | A1 | 3/2017 | Arastafar et al. |
| 2017/0235848 | A1 | 8/2017 | Van Dusen et al. |
| 2017/0250490 | A1 | 8/2017 | Chao et al. |
| 2017/0250940 | A1 | 8/2017 | Chao et al. |
| 2018/0032997 | A1 | 2/2018 | Gordon et al. |
| 2018/0052587 | A1 | 2/2018 | LaPier et al. |
| 2018/0349659 | A1 | 12/2018 | Manzari et al. |
| 2018/0367484 | A1 | 12/2018 | Rodriguez et al. |
| 2018/0373415 | A1 | 12/2018 | Dellinger et al. |
| 2019/0102396 | A1 | 4/2019 | Pan et al. |
| 2019/0138951 | A1 | 5/2019 | Brownhill et al. |
| 2019/0139150 | A1 | 5/2019 | Brownhill et al. |
| 2019/0347181 | A1 | 11/2019 | Cranfill et al. |
| 2019/0392345 | A1* | 12/2019 | Adaska .................. G06N 20/00 |
| 2021/0081227 | A1* | 3/2021 | Verma ................... G06N 5/003 |

OTHER PUBLICATIONS

Srinivasan, Vijay et al., "Mobileminer; Mining Your Frequent Patterns On Your Phone." UBICOMP, Sep. 13-17, 2014, Seattle, Washington. 12 pages.

"Final Office Action," dated Jun. 1, 2021 in U.S. Appl. No. 16/835,075. 19 pages.

"Non-Final Office Action," dated Jan. 6, 2021 in U.S. Appl. No. 16/835,075. 17 pages.

U.S. Appl. No. 16/835,075, Non-Final Office Action, dated May 17, 2022, 21 pages.

\* cited by examiner

FEATURE DETERMINATION FOR MACHINE LEARNING TO SUGGEST APPLICATIONS/RECIPIENTS

BACKGROUND

Modern mobile devices (e.g., smartphones) may contain many applications. Certain applications may be designed to enable a user to interact with or communicate with other users. For instance, in addition to providing the capabilities of placing phone calls and sending SMS text messages, modern mobile devices may contain communication applications for composing email messages, instant messages, and for initiating video calls and video conferences. As modern mobile devices become more integrated with modern day life, the number of communication applications and contacts stored on the mobile devices increases. It is not uncommon for modern mobile phones to have multiple applications that can be used to interact with other users. Having numerous applications for interacting with people may allow the mobile device to be particularly useful to the user; however, it may be difficult and time consuming for the user to find and select a desired recipient amongst all of available contacts that the user wishes to interact or communicate with.

BRIEF SUMMARY

Various embodiments of the present disclosure can provide suggested applications for a user of a computing device. The suggestions can be provided on a user interface for a user to select, thereby increasing efficiency for the user, who would otherwise have to perform additional actions or keystrokes to perform the selection. A suggestion engine can use historical user interactions that include applications (potentially used to communicate with a recipient) and contextual data to determine which application to suggest. The user interactions may occur in a variety of ways, e.g., after a content object has been selected within a host application, where a communication application is selected thereafter.

The historical user interactions may be mined to create a pattern model (behavior rules). The pattern model may operate on interaction data stored in a database to generate rules based on identified repetitive patterns of features. The rules may then be applied to the current context of the mobile device and filtered to determine a set of rules relevant to the current context. Features may be derived from the relevant rules and input to a machine learning model adapted to the specific interactions of the user. One or more suggestions for an application to use can be provided by the machine learning model, with the suggestions provided on a user interface for selecting. As an example, based on the input features, the machine learning model may rank the rules in order of their importance for suggesting an application a recipient, or both. Suggestions for an application, a recipient, or both, may be extracted from the ranked rules and can be displayed on a user interface in an order of probability of selection by the user as determined by the machine learning model.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
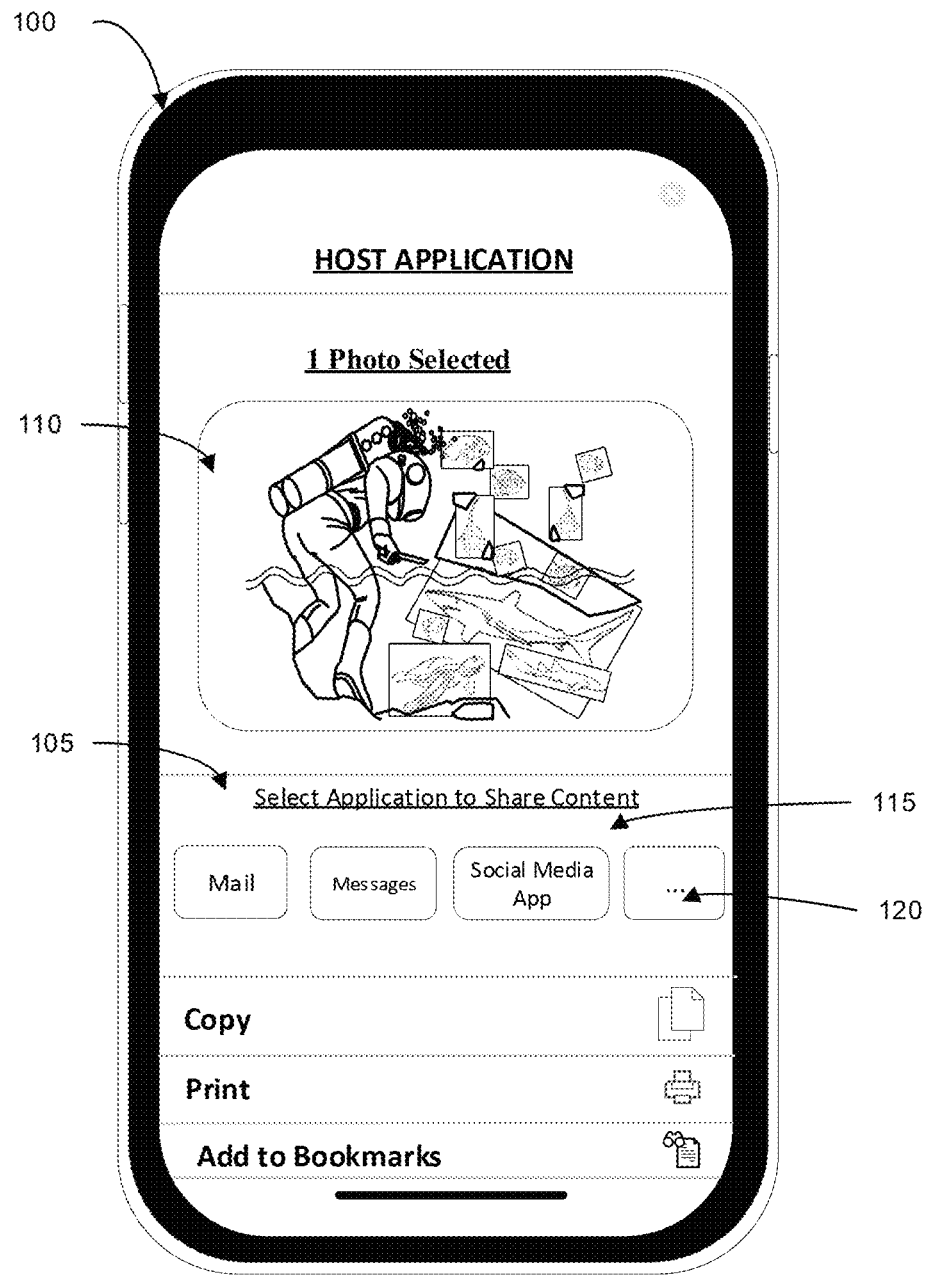
FIG. 1 shows an example user interface of an example mobile device illustrating a process for selecting an application to share content that may be improved be embodiments of the present disclosure.

Various embodiments of the present disclosure can provide suggested applications and/or recipients for a user of a computing device to perform communication. The suggestions can be provided on a user interface (UI) for a user to select, thereby increasing efficiency for the user, who would otherwise have to perform additional actions or keystrokes to perform the selection. As an example of the UI, a list (e.g., photos, icons, etc.) of suggested people may appear on one row and a list of applications (e.g., messaging apps, mail apps, document readers/organizer apps, Facebook, etc.) may appear on a row below the suggested people. The people and applications displayed on the UI may be ranked, for example from left to right, in order of importance. In addition, groups of people, for example message groups, and associated applications may also be suggested and photos or icons representing a name (e.g., family chat, workgroup, etc.) for the group may be displayed on a user interface (UI).

Various aspects of the present disclosure may also suggest the application for a user to share with a suggested person. For example, the photo or icon of the suggested person displayed on the UI may include a smaller icon representing the suggested application. While an application for sharing may be suggested, the user may be capable of overriding the suggestion and selecting a different application (also referred to as an 'app') to share with.

In order to generate suggested recipients and apps, the mobile device may store a history of the interactions that were created by the user both by simply sending messages as well as specifically sharing to people. For example, a user may send messages to other people using a messaging app. Sending the messages may trigger the mobile device to log the interactions. The interactions may be stored in a database in memory of the mobile device. Each interaction may include the application, the recipient, the content, and other features related to the context and the content that were shared. Rules may be developed from the user interactions, and the rules matched to the current context of the mobile device usage to identify rules relevant to the current context. Features may be derived from the relevant rules and used as input to a machine learning model, which can be used to provide suggestions for an application. For example, the machine learning model may assign importance scores to the rules, and suggestions for apps, recipients, or a combination, may be extracted from the rules having the highest importance scores.

Various aspects of the present disclosure can examine the context (e.g., time, location, application used, the content being shared, etc.) in which sharing takes place. The context and the content can be featurized to generate a list of suggested people to share with in similar contexts in the future.

I. Example Communication Interactions

Each communication interaction may include features related to the context and any content that was shared, as well as the recipient of the sharing. For example, interactions may include a source (host) application, a target (communication) application, content type of any content shared, interaction type (e.g., mail or messaging), recency of interaction, temporal encodings (e.g., particular time and date), as well as other features. Each interaction may be stored in a database in the memory of a device (e.g., a mobile device). The database may store all communication interactions for a specified storage time period, for example several months. Stored interactions may "age out" after the storage time period expires and be removed from the database.

In some examples, interactions may be initiated by a sharing operation to share a content object, for example, pushing a share button on a user interface (UI) of the mobile device. Initiating the sharing operation may also trigger a prediction of a sharing recipient and a target communication application to perform the sharing communication, for example, a mail program, a messaging program, etc. In other examples, a user can already have selected a communication, and thus only the recipient may need to be suggested.

A. Content Sharing Example

In some embodiments, a communication interaction may involve sharing a content object from a host application, e.g., a photo application, web browser, social media application, etc. A user interface associated with the host can allow a user to indicate that content should be shared. Examples of such content include photos, files, URLs, a deep link for a website (e.g., a hypertext link to a page on a Web site other than its home page), or a deep link to an application (e.g., a link to a page/window other than an app splash screen).

FIG. 1 shows an example user interface of an example mobile device 100 illustrating a process for selecting an application to share content that may be improved by embodiments of the present disclosure. As depicted, a user has selected a photo 110 for sharing. As examples, the photo may have been selected in a photo app or a camera app (e.g., after taking a photo an icon can be displayed for selecting the photo). The photo or camera app can be considered a host app. Some embodiments can use the identity of the host app (e.g., via a host identifier) to make improvements, as will be described later.

After the photo is selected, the user can provide a user request to share the photo. Such a user request can be provided in various forms of user input, e.g., selecting a button or other selection object on a screen or via a voice command. For instance, a share button can be provided on a screen that is shows the content to be shared. As an example, such a screen may show a website, where the content to be shared is a URL for the website. In some embodiments, the selection of the content object can also act as the user request to share the content object.

After receiving the user request to share the content object, a sharing routine can be invoked. The sharing routine can include a user interface 105 for selecting actions to be performed with photo 110. For instance, a list 115 of applications can be provided, e.g., for the user to communicate the content object (photo 110 in this instance). This list 115 of applications can be a default list, e.g., as configured by the user or by the manufacturer of the operating system of the device. The list 115 can be generated without regard to what host application was used to select the content object or to whether any of the applications in list 115 actually can be used to communicate photo 110, which can cause errors or user frustration. Some embodiments of the present disclosure can address such issues.

Further, the list 115 of applications may not be the application that the user wants to use. Thus, a user may need to scroll the list (e.g., if the list includes more app icons than can fit on the screen) or select a more button 120, which can provide a list of applications for the user to browse. The need for such additional actions by a user can frustrate a user.

Additionally, after the desired application is selected, the user would still need to provide the recipient to which the content object is to be shared. The user may have to scroll through a contact list or have to remember the specific name under which the desired recipient is stored. For instance, the user may want to send the content object to 'John,' but the user may have multiple contacts with that name. Again, such extra actions required of the user can cause frustration.

To address such problems, some embodiments can identify applications that a user is mostly likely going to use, and then provide an ordered list of those applications. In this manner, the sharing routine is more likely to display the desired application on the initial screen, e.g., in one of the first three slots, as is displayed in FIG. 1. Further, some embodiments can recommend a particular recipient, potentially in combination with a particular application.

B. Other Examples of Communication Interactions

Aspects of the present disclosure may also enable disambiguation of people by an electronic personal assistant (e.g., Siri™) and/or users of mobile devices that the mobile device might detect in the area, for example, via ranging signals or received beacons. In such a situation, the communication application could be AirDrop™ or other local wireless communication protocol. Other examples include a user selecting a communication application, where a suggested recipient can be provided after the selection.

Communication interactions may also be initiated by other types of user requests such as unlocking the mobile device, mobile device movements (e.g., pointing the mobile device in a direction detected by an accelerometer), voice commands, opening a contact list, etc. For example, opening a contact list may initiate an email application.

In other embodiments, the user request may be based on internal device settings, a periodic timer, location of the user, etc. For example, a communication interaction to contact another person may be triggered by a when a location such as a particular restaurant is detected by the mobile device.

C. Interaction Features

Interactions may have a specified number of features that may be captured during the time windows. However, not every feature of the specified number may be captured for any given interaction. Some features that may be captured for an interaction are as follows.

The source (host) app may be the source of any content to be shared, e.g., as described in FIG. 1. The target (communication) app may be the app used to share content. In some cases, the source app and the target app may be the same app. In other case, the source app and the target app may be different apps. For example, the source app (i.e., the source of the content) may be a web browser and the target app to share the content may be a mail program.

The content type may be a form of a content object, for example, a video, a document, etc. A content object may have other properties, e.g., a location that the content was created or people identified within the content (e.g., in an image). Such data can be considered metadata of the content object.

The interaction type may be the mechanism for communicating the content, for example, mail, messaging, etc. The interaction type may be broader than the target app feature. For example, two different messaging target apps could have same interaction type.

A recency of interaction may be determined for any interaction, a particular type of interaction, a same exact interaction with a particular recipient with the same source app, etc. Each interaction may be timestamped at its occurrence to enable determining how recent the interaction occurred, e.g., relative to a current time.

Temporal encodings can provide a format for storing time data and may include, for example, recency, time of day, day of week, etc. Temporal encodings can provide a way of taking a particular time and breaking it off into these different components that make up that time. In some embodiments, interactions may be captured over fixed length time windows when the interactions are triggered (e.g., by sending a text, email, etc.). For example, interactions may be captured over a two-second time interval or another length time interval. Each time interval is treated like an event. One event may occur within a time interval. Thus, a single the time window may capture a single interaction.

Other features may include holiday, location, proximity, photos of scenes and/or people, photo metadata, photo graphs, URL domain/subdomain, dominant text topics, favorites. One of ordinary skill in the art will appreciate that this is not an exhaustive list. The captured interactions may be stored in a database in memory on the mobile device.

II. Example System for Suggesting Applications/Recipients

Various embodiments can suggest applications and/or recipients. In the example of FIG. 1, a suggested list of applications (e.g., as an ordered list) can be provided. Additionally or instead, a list of recipients can be provided as well, e.g., in a separate row. Further, the list of recipients can be displayed as a combination icon that includes a recipient and an application. In embodiments where just a recipient is suggested, a communication application may already be selected, and thus the recipient suggestions can be based on that selected application. In the sharing example of FIG. 1, the communication application has not already been selected.

In some embodiments, the software architecture for enabling efficient responses to user requests or other response triggers, for example, but not limited to, requests for sharing of a content object, can include a response routine and a suggestion engine. These software modules can work together to provide a user interface that provides an ordered list of communication applications and/or potentially application/recipient combinations for sharing a particular content object that has been selected using a host application. Either or both of these software modules can use gather context data (e.g., location, host identifier, time of day, etc.) so that the suggestion engine can determine the ordered list for the sharing routine to display. Context data is also referred to as features, as used above.

Figure 2:
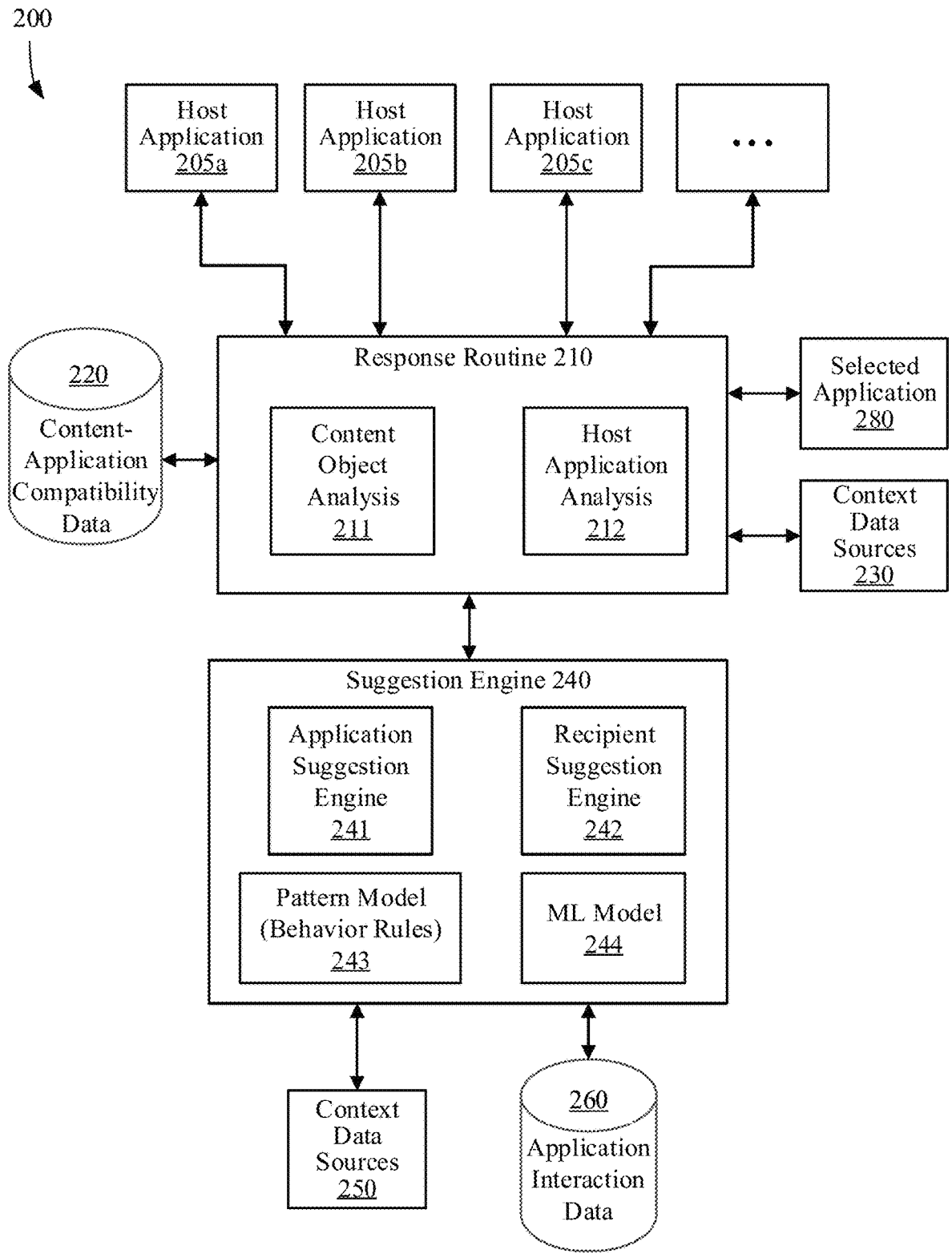
FIG. 2 shows an example system for sharing a content object using a suggested application according to embodiments of the present disclosure.

FIG. 2 shows an example system 200 for responding to a user request or other response trigger according to embodiments of the present disclosure. System 200 includes host applications 205a-205c that can interface with a response routine 210, which can interface with a suggestion engine 240 that suggests one or more applications (and potentially recipients), as well as a selected communication application 280 for responding to the user request. These modules can interface with various other components as part of providing this functionality on a mobile device (e.g., a phone, tablet, or wearable device, such as a watch) or a larger computer that is not mobile.

Multiple host applications 205a-205c are shown communicably coupled with response routine 210. Such an interface can be provided in various ways, e.g., each of the host applications can include a framework that provides a UI to initiate the response routine. Such a framework can include a list of selectable options at a bottom of a screen of the host application. Such a list of selectable options can be part of the host application or provided by the system software. If provided by the system software, the operating system can track which host application is in operation at a given time, so that communication can occur between response routine 210 and the host application that is currently executing.

Accordingly, at any given time, response routine 210 can be invoked via a function call from a host application or via a system call in response to a user request or other response trigger. As part of the invocation (e.g., a user selecting a button to share a selected content object), the host application can provide a host identifier and a content identifier to response routine 210. The providing of such data may be via other system software, e.g., that monitors for which application is currently being used and stores associated host identifiers for applications, such that the corresponding host identifier can be retrieved and provided to response routine 210.

Similarly, the host application can provide information to response routine 210 about a selected response, for example, a selected content object (e.g., a content type, size of the content object), and a content identifier (e.g., a memory location, a file identifier, a URL, etc.). As further examples, a host application can provide preferences to the response routine, e.g., preferences for a communication application to be used (which may specify exclusions of a communication application). Such preferences may be based on historical interactions of other users of other devices.

Response routine 210 can perform various operations, including a content object analysis 211 and a host application analysis 212. Each of these services can use information obtained from the host application regarding the current session, e.g., as just described above. The outputs of these analyses can be sent to suggestion engine 240, e.g., as part of a ranking of likely applications or potentially to exclude certain applications.

For example, content object analysis 211 can access a database that includes content-application compatibility data 220, which can specify which applications support which content types. For example, the database can store a table that indicates a particular email app can support communicating an image, video, a URL, and others. But, potentially, the email app cannot support communicating a deep link to a particular page in a different application. In this manner, a non-supported application can be excluded from any list of suggested applications that are provided in a user interface for the user to select. Such exclusion can be performed by response routine 210 or suggestion engine 240.

As further examples, other information about the content object can be determined, such as people in a photo (or otherwise mentioned or appearing in the content object), graph knowledge of associations of the content object to applications or contacts (e.g., a graph of photos that highlight associations among people in the photos), metadata associated with content object, topics mentioned in text of the content object, text in a transcription of an audio file, or webpage domains and topics. Topics may be mined from text-based contents such as messages and emails the user exchanged over time with their contacts, and the contacts as well as the user may be tagged with interested topic information. When content is being shared where topics can be identified, the contacts that were previously tagged with those topics may be suggested.

As for host application analysis 212, it can obtain the host identifier for sending to suggestion engine 240, which can use the host application in a suggestion model to determine which communication application is mostly likely to be selected for the current host application being used. As another example, host application analysis 212 can receive statistical information from the host application about historical interactions, where such statistical information can be passed to suggestion engine 240. Such historical information can be sourced from other devices and managed by the host application, where the statistical information can be aggregated and analyzed by a host server associated with the host application such that person information is not provided outside the device. A host application could also specify particular preferences for sharing particular types of content, e.g., particular content of a host application may be designed to be used by a specific communication application.

Response routine 210 can also obtain current context data from context data sources 230, e.g., movement information from an inertial motion unit (IMU), time and date from a clock and calendar app, location from GPS or other location circuitry, proximity to devices of other users that are in the device's contact list, and previous applications used before the host application. To measure proximity to other devices, ranging signals (e.g., UWB) can be used, e.g., to measure time of flight, as is described in U.S. Provisional Application 62/738,915, which is incorporated by reference in its entirety. Content data sources 230 can save such data in memory, and response routine 210 can retrieve any such data that is desired. Alternatively, sharing response 210 can contact the particular data sources and obtained the contextual data on-demand.

Suggestion engine 240 can receive a suggestion request from response routine 210, along with various information, e.g., as described above. In some embodiments, suggestion engine 240 can obtain any contextual data from context data sources 250, which may or may not be the same as context data sources 230. Thus, some contextual data can be obtained via response routine 210 and some contextual data can be obtained directly by suggestion engine 240.

Suggestion engine 240 can use application interaction data 260 stored in a database. Application interaction data 260 can store records of historical user interactions that can be mined for patterns and/or similarities to a current context so as to suggest a list of application that are most likely to be selected. Such a list may be ordered. Each historical interaction can be recorded as a separate time entry in the database. Such records can be saved periodically, e.g., every two seconds or other time scale where it is likely only one type of interaction would occur per time interval (temporal encoding). Each historical usage record can include any of the contextual data mentioned herein. Further details about suggestion engine 240 are provided in later sections.

As shown, suggestion engine 240 includes an application suggestion engine 241, a recipient suggestion engine 242, behavior rules 243, and a machine learning (ML) model 244. Features derived from the behavior rules 243 may be input to the ML model 244. The suggestions of application and recipients can operate independently or as a single suggestion engine. For example, a suggestion of a recipient can be applicable to other instances than when a content object is shared from a host application, e.g., when a communication application has already been selected. Either of these suggestion engines may utilize models described herein. When the two engines act as a single engine, a most likely pair of communication application and recipient can be identified. Such a pair can still be applicable even when the user has already selected the communication application.

III. Extraction of Features from Pattern Model for Ml Model

As described above, the suggestion engine 240 may generate suggestions based on features that are derived from a pattern model for use with a machine learning model. Rules from the pattern model may be filtered based on their antecedents and consequents to find rules that match the current context of the mobile device usage. Features for the machine learning model may be derived from the resulting set of filtered rules.

Figure 3:
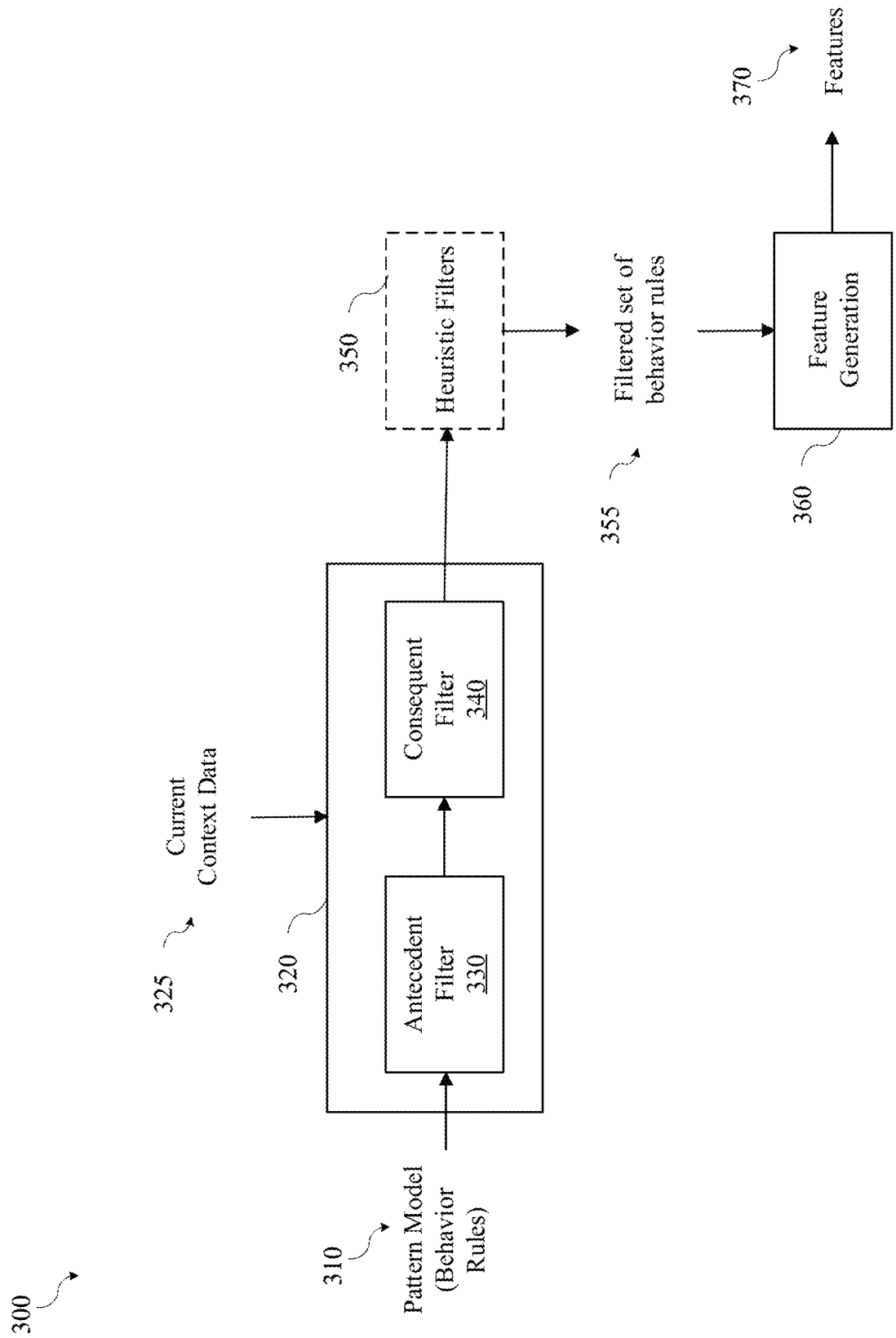
FIG. 3 is a block diagram illustrating a process of deriving features from behavior rules according to embodiments of the present disclosure.

FIG. 3 is a block diagram illustrating a process 300 of deriving features from behavior rules according to embodiments of the present disclosure. As shown in FIG. 3, features may be extracted from behavior rules formulated from a user's historical interactions with the mobile device. The historical interactions may provide information related to the user's sharing behavior from which the behavior rules can be formulated. Each rule may have an antecedent portion and a consequent portion. The antecedent portion may include information related to the context around the use of the mobile device, for example, time of day, day of week, location, etc. The consequent portion may include information indicating that the device was used to share content, for example, an app such as an email or messaging app, a recipient that the content was shared with etc. FIG. 3 illustrates an overview of the process of extracting features from the behavior rules.

When a response request is triggered, relevant behavior rules 310 may be filtered by a matching routine 320. The matching routine 320 may include an antecedent filter 330 and a consequent filter 340, and may filter the behavior rules based on current context data 325 from the mobile device. The antecedent filter 330 may filter the behavior rules 310 by matching the current context of the mobile device usage with the context of the behavior rules. The consequent filter 340 may filter the behavior rules that pass the antecedent filter 330 to determine if the rule applies to a certain behavior, e.g., a sharing behavior involving a recipient and/or an app. Optionally, heuristic filters 350 may be applied to the rules. A filtered set of behavior rules 355 may be generated by applying the filters. Each of the rules in the filtered set of behavior rules 355 may have portions of antecedent data or portions of consequent data, or both, that match portions of the current context data. The current context data may match different rules with different antecedent/consequent combinations. For example, the same application may be used to share different content with different recipients at different times of day from different locations. Features may be derived from characteristics of the filtered set of rules 355.

A feature generation module 360 may analyze various characteristics of the filtered rules to derive features 370 that capture characteristics of the rule, the context, matching between the rule and the context, and characteristics of the user. The features 370 may be input to a machine learning model to generate ranked suggestions of a recipient and/or an app for sharing.

A. Pattern Model

The pattern model (behavior rules) 243 may tune the predictions of recipients and apps to be more specific to the user's behavior based on their past behaviors. The pattern model 243 may operate on all interaction data stored in the database 260 to generate the behavior rules based on identified repetitive patterns of features. The pattern model 243 may execute overnight or during other idle times of the mobile device. The pattern model 243 may extract data from the interactions 260, and output another database (referred to herein as the pattern database) that can be queried at the time a prediction is being made. For each of a set of input criteria, such as source (host) app, target (communication) app, time of day, etc., the pattern database can specify a list of the people and apps to suggest.

Such a pattern model can take various other forms besides a database of rules having certain criteria as an antecedent and outputting suggests apps/recipients as a consequent. For example, in some implementations, a neural network may be used in the pattern model.

1. Pattern Mining

According to various aspects of the present disclosure, a pattern mining process can mine and form context patterns and associative rules. Interesting correlations could be learned such as: sharing pictures of cars with a particular friend/group of friends.

A general purpose framework can take events over time and place them into windows of time. The windows may be very short, for example, two-second windows in which an interaction occurred. In some cases, the window size could be longer (e.g., 3 or 4 minutes) or shorter (e.g., 1 minute). The pattern mining algorithm can take all the interactions that happened in the windows and across all of the interactions across all time for which data exists, and find patterns in the features across the interactions that occur inside of the windows.

The pattern model 243 can execute on the whole interaction history using all of the stored interaction data in the database 260 to find these rules. Based on privacy constraints, however, data may age out over time.

2. Association Rule Learning

For each window (e.g., 2s), an interaction is stored for a given recipient, target app (e.g., communication app), and other features as discussed above. Each window may be examined, and recurring patterns of features over time can be identified. Patterns that occur a number of times that exceeds a minimum threshold may be identified as frequent patterns. For example, a pattern of sending an email to a particular recipient in the evening on certain days of the week may be identified as a frequent pattern.

Based on the frequent patterns that were found, the training algorithm can generate rules having an antecedent and a consequent. The antecedent is a state of the features (i.e., the context of an interaction) and the consequent is the suggestion (e.g., recipient and/or app). For example, the algorithm may identify a certain feature pattern that exceeds a minimum threshold in the overall number of interactions. For that feature pattern, the antecedent led to a particular consequent (e.g., a recipient and/or an app) a certain percentage of the time, e.g., above a threshold percentage. When the pattern database is queried using the current context as the antecedent, the query searches for the rule antecedent being equal to or containing items from the current context and examines the consequent to determine if it contains a person and an app. The person and the app in the consequent may be returned as a suggestion. Suggestions may be sorted based on confidence (i.e., how likely the occurrence is) and/or frequency of occurrence.

During the antecedent matching in response to a request trigger, rules having antecedents containing any of the features in the current context may be identified. Several different rules may be identified that match the current context at least in part. Each rule may have a different number of antecedent features based on the previous pattern matching. When a prediction is initiated, the current context is captured and rules may be identified in which the antecedent contains one or more features of the current context. For example, if a current context had 10 features and a particular rule antecedent matched on six of the 10 features in the current context, because that antecedent only had six features in it, the consequent for that rule may be suggested.

Different subsets of the features in the current context may match to different antecedents. One rule might match because a user often shares to this person at a particular time, and another rule might match because the user shares with a particular person at a particular location. In each case, those rules can be sorted by a confidence metric, which is how often that antecedent applies to that consequent based on past interactions. Each identified rule may generate a different suggestion (e.g., the recipient and the target app). Ranking of the suggestions may be based on the confidence of the rules. In one embodiment for such a case, the ranking is not performed based on the amount that the antecedent overlaps with the current context (e.g., the number of matching features). When two of rules have the same value for the confidence metric, the rules may be sorted based on a support metric, which indicates amount of times that the rule has occurred in the past.

As a result of the query to a pattern database, a list of matching rules is generated. The rules are sorted first by the confidence metric and then by the support metric. Every rule may have the recipient and the target bundle ID (e.g., the target app). Each rule can be a one-to-one mapping to a suggestion. Multiple rules having the same recipient may be deduplicated.

3. Constraints on Rule-Making

The rule-making process may be constrained to stop attempting to form rules. For instance, it may be unlikely to generate a rule that includes certain information (e.g., a person for the user to share to or an application for the user to share from) in the consequent of that rule. By constraining the process to figure out associations that contain either people or applications in the consequent of the rule prior to generating rules, the complexity of the rule making process can be decreased, and thus the process can be faster and/or use less memory or processor time.

In order to form rules, each item set (e.g., features of each interaction stored in the database on the mobile device) for each interaction may be broken down into subsets of the item set. As a result, it may be possible a rule formed based on a particular subset could have something irrelevant in the consequent. In order to avoid wasting computational resource generating irrelevant rules, some embodiments can perform filtering at two levels. One level of filtering is to limit the number of item sets during the mining of frequency of an item set by constraining the item sets to contain either a recipient or a target app. Another level of filtering can be to store only rules formed that contain either the app or the person or both in the consequent.

a) During the Frequent Item Set Mining

One way to enforce such a constraint is during the frequent item set mining. A rule can include a left hand side (antecedent) and the right hand side (consequent). To identify a rule, a set of types or events is determined. Before the rule is formed, it is first determined which of those sets are frequent across all of the items occurring in the data to figure out which of these actual sets are candidates to form rules. Candidate item sets are defined as item sets having patterns that occur for a certain number of times or more in the collected data.

While it is forming item sets, the algorithm may find the frequency of each item as a singleton. Then pairs are formed with each singleton, triples are formed with each pair, and so on. For example, at the pairs level, two pairs AB and CD may be identified. At the triples level, these pairs may form item sets ABC and ABD or some other permutation thereof. At each level of item set formation, all of the items in the item set so far are examined and frequency of occurrence of the item set is determined. Item sets that contain a recipient or an app and meet a minimum occurrence threshold may be candidates for forming larger item sets. The minimum occurrence threshold may be may be the same for all item set levels or may be different.

The process may continue to determine which item sets are frequent given the fact that they contain a recipient or a target app. More features may be added to an item set and the frequency of the resulting pattern determined, for example, based on a minimum occurrence threshold. If, however, the frequency of the resulting pattern does not meet the minimum occurrence threshold, or if the item set does not contain a recipient or a target app, the item can be discarded and no rule is attempted based on that item set. For example, if an item set contains three items, but does not contain at least a recipient or an app, there is no need to determine its frequency of occurrence because the item set cannot produce a rule that contains the desired consequent (e.g., a recipient and/or an app). Pruning the potential rules in this manner can provide an optimization that reduces the computational cost of actually figuring out frequent item sets across all of the data.

Item set formation may continue until no larger item sets can be formed. At that point, rule formation may begin.

b) During Rule Formation

Rules may be formulated based on people/groups a user shares with. The antecedent is the first half of an if-then statement (i.e., the "if" portions) and the consequent is the second half of the if-then statement (i.e., the "then" portion). For example, "if you detect a known user within range" (antecedent portion), "then share a photo" (consequent portion). According to various aspects of the present disclosure, the rulemaking process mines and forms patterns and rules, but constrains the process to stop attempting to form rules if it is unlikely to generate a rule including information such as a person for the user to share to or an application for the user to share (or otherwise communicate) from in the consequent of that rule. Complexity is decreased by determining associations that contain either people or applications in the consequent of the rule.

Another way to enforce that constraint is in the actual rule length. The larger item set may be broken into subsets of antecedent and consequent pairs by identifying all of the subsets of that item set. Thus, a particular rule may have an item subset that includes an antecedent and a consequent. For each antecedent-consequent subset, a rule may be found. Rules are stored only if the consequent actually contains either the app or the person or both. For example, a subset can contain items ABCD and E. If a rule is formed that has AB and E in the antecedent and D and C in the consequent, but B and C are actually desired in the consequent, that rule may not be stored. Only relevant rules, i.e., rules with B and C in the consequent may be stored (e.g., when B and C are the recipient and target app). As a result, the storage footprint of all the rules can be further reduced and, at prediction time, querying speed is increased because fewer but more relevant rules are queried.

According to various aspects of the present disclosure, at prediction time when the rules are queried, a list of suggested persons and associated apps may be generated as output. In some implementations, only suggested persons or only suggested apps may be generated as output. In some implementations, the pattern model may be configured to mine for different items in the consequent and generate corresponding rules.

4. Confidence

Confidence represents the proportion of times B co-occurs with A. The notion of a confidence in a rule is, given the fact that the antecedent occurs how many times the antecedent and the consequent occur. For example, if the antecedent ABC appears 100 times and the consequent D appears only 80 times, the confidence of the antecedent ABC plus the consequent D is 80 over 100 or 0.8. In some implementations, the confidence for a rule to be used may be at least 10%.

An accuracy metric of the rules can be tracked, e.g., in a sharing context. A performance metric for accuracy can be a number of correctly suggested (contact, app) pairs for sharing/total number of (contact, app) time a sharing routine was invoked. This accuracy metric can be used when the patterns are next updated. For example, rules having an accuracy below a threshold can be discarded, and rules having an accuracy above a threshold can be automatically kept.

B. Matching (Filtering) Routine

The matching routine 320 may filter the rules based characteristics of antecedent and consequent of each rule compared to the current context data 325 of mobile device usage. The antecedent of a rule may capture the current context of the situation, for example, what the environment is, e.g., in terms of time, location, currently running apps, etc. The rule antecedent tries to capture the current context. Information gathered about the current context may or may not match a rule, as the pattern model can have many rules for numerous contexts. The antecedent filter 330 may be applied to determine if a rule's context (antecedent) matches the current context. A particular piece of contextual data can match the antecedent of multiple rules. For example, a rule may have only one piece of contextual data A in the antecedent, while another rule may have multiple pieces (A, B) of contextual data. If the current context includes A, then a match can occur for both of the rules.

The consequent filter 340 may be applied to determine if a particular behavior, for example, a sharing behavior, is contained in the rule. As another example, it can be determined what is to be suggested (e.g., a recipient, application, a content item, etc.). If that item is not part of the consequent, then that rule can be discarded. In relation to the behavior, the consequent may include a person, an app, or a combination.

Optionally, heuristic filters 350 may be applied to the rules. The heuristic filters 350 may filter on qualitative parameters tailored to specific aspects of the context. For example, a recency heuristic may check whether the user interacted with a person or group within a specific time period, or a proximity heuristic may show a best nearby wireless ad-hoc sharing recipient.

C. Feature Generation Module

Features for input to the machine learning model may be derived from the set of filtered rules 355 generated by the matching routine 320. The feature generation module 360 may operate on the set of filtered rules to derive the features. In various embodiments, the features can be generated on a per rule basis or generated for the collection of filtered rules. Information related to the rules may be used by the feature generation module 362 to derive the features. As various examples, the features can be generated by extracting pieces of contextual data, by binary inquiries about whether a particular piece of contextual data exists in a rule, or performing a statistical analysis of the historical user interactions for the rule (e.g., a frequency or confidence). Specific examples of features include a confidence that a particular consequent will occur with a given antecedent, or a number of times that a particular rule has been triggered, as well as the antecedents and consequents from the rules, together with current context information gathered from the mobile device.

The features that are derived may include rule characteristics, context characteristics, rule and context matching characteristics, and user characteristics, among other characteristics. The derived features related to rule characteristics may be binary enquiries about whether a contextual item, such as location of interest, time of day, antecedents in the rule, etc., is present in a rule. The derived features related to context characteristics may be features concerning which contextual content/items, for example, location of interest, a number of photo contact designations, etc., are present in the current scenario where suggestions are being made. The derived features related to matching contextual items in rule characteristics may include binary and categorical features indicating that the current context under which suggestions are being made match fully or to some degree with content/ items (e.g., weekend antecedent, time of day antecedent, etc.) present in the characteristics of rules. The derived features related to person characteristics may be features about the user to which suggestions are being presented, such as total number of prior interactions, total number of unique photo contacts used in rules, total number of messages sent, etc., among other features. The features derived from a rule are governed by the information that is actually present in the rule itself. Thus, only those characteristics applicable to a given rule may be extracted and featurized.

In some embodiments, the features input to the machine learning model may not be used to generate a ranked list of the set of filtered rules. Instead, the machine learning model may directly output suggestions based on the features derived from the rules. In such cases, statistics or binary results to questions about the matching rules can be combined and determined for each application, and those features can be input to the ML model.

IV. Example Suggestion Engine

The suggestion engine can be implemented in various forms and use various models. For example, more than one model may be used, and the results of the models may be used to generate features for a machine learning model. A first type of model can run periodically (e.g., every night), but then be saved such that it is static until the next training session is performed. Such periodic generation and saving would be uncorrelated to user requests, since the periodic operation is not done in response to a user request. Such training can include a pattern mining routine that mines the historical interactions for patterns of when an application, recipient, or combination of application/recipient are selected. A second type of model can use recent interactions to generate a model on-demand when a request for a suggestion is received. Using the input features derived from the rules determined using the various models, the machine learning model can generate suggestions for one or more applications and/or recipients. For example, the machine learning model can generate importance scores for the rules. In various implementations, the importance scores can used as a ranking to determine the suggestions (e.g., looking at the consequents of the ranked rules) or as a weighting to be used in conjunction with a frequency of the rule being triggered in historical transactions. Accordingly, suggestions for applications may be extracted from rules having the highest importance scores. In some embodiments, the machine learning model may directly output the suggestions.

Figure 4:
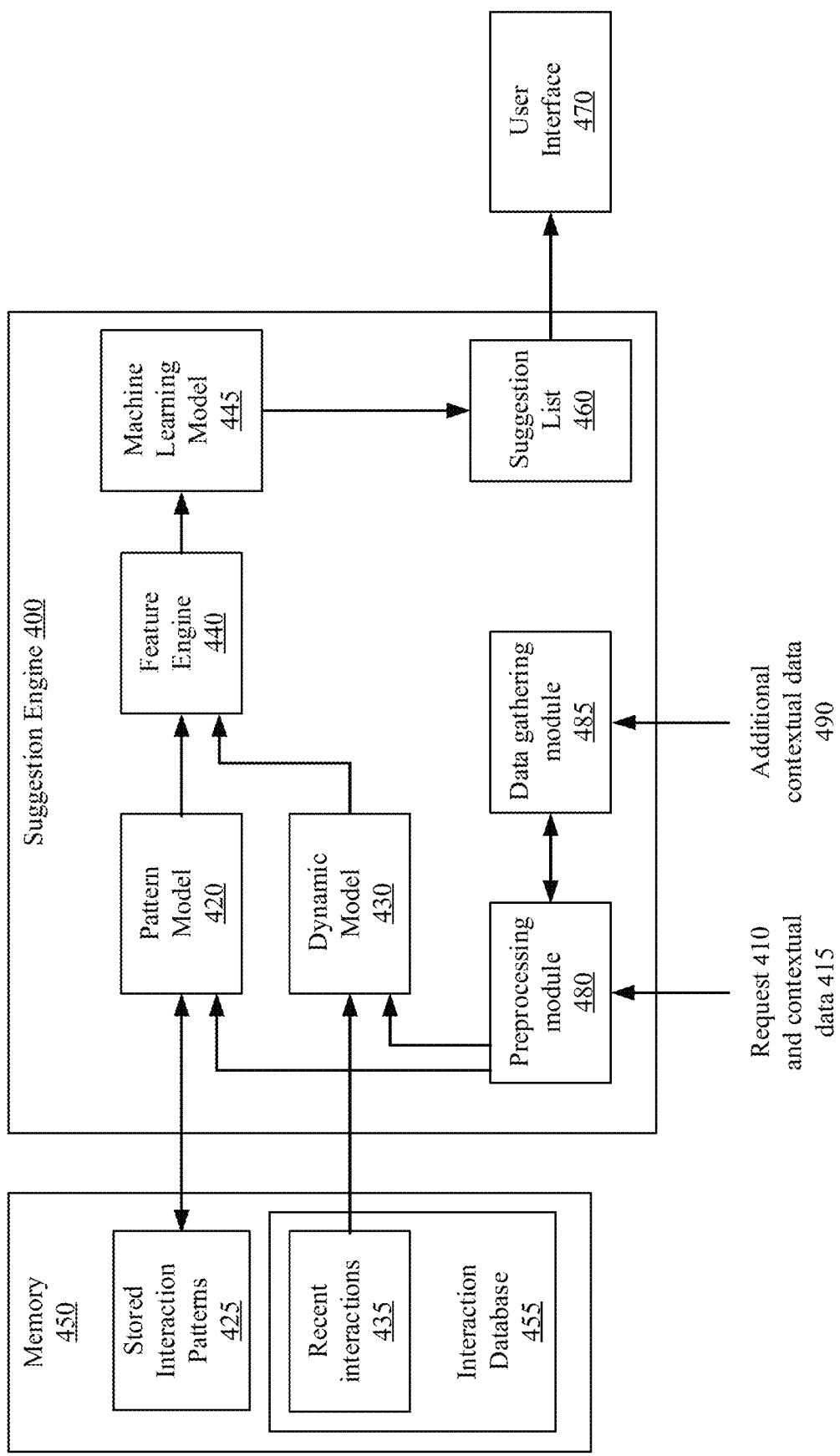
FIG. 4 is a block diagram illustrating a suggestion engine with first and second models and a machine learning model according to embodiments of the present disclosure.

FIG. 4 is a block diagram illustrating a suggestion engine 400 with pattern and dynamic models and a machine learning model according to aspects of the present disclosure. Suggestion engine 400 may include a pattern model 420, a dynamic model 430, a feature engine 440, and a machine learning model 445. The pattern model 420, the dynamic model 430, the feature engine 440, and the machine learning model 445 may be implemented by the processor of a device (e.g., mobile device 100) and may generate suggestions for recipients and/or apps, e.g., for sharing a content object as described above. In various implementations, the pattern model 420, the dynamic model 430, the feature engine 440, and the machine learning model 445 may be implemented by hardware and/or software separate from the processor of the mobile device. The pattern model 420 and the dynamic model 430 may each correspond to an application suggestion engine, a recipient suggestion engine, or a combination of both.

The pattern model 420 may use stored interaction patterns 425, which can be determined from historical interactions in an interactions database 455 of memory 450. Such a pattern model can take various other forms besides a database of rules having certain criteria as an antecedent and outputting suggests apps/recipients as a consequent. For example, in some implementations, a neural network may be used in the pattern model.

The stored interaction patterns 425 can be generated periodically, e.g., as described above for the first type of model. A pattern mining engine (not shown) can retrieve the historical interactions from interaction database 455, identify interactions patterns, and then store the interaction patterns 425 in memory 450. Then, when a request 410 is received, the first model can retrieve any relevant interaction patterns (or all the patterns and then identify any relevant ones), where relevancy can be determined based on contextual data 415. Contextual data 415 may include any of the various data described herein, e.g., a host app identifier, a content identifier, a type of a content object, a communication application that has already been selected (e.g., when only a recipient needs to be determined), location, etc.

The dynamic model 430 may be generated when a prediction is triggered, as opposed to using a stored model, e.g., as stored interaction patterns 425 are used. When a prediction is triggered, the dynamic model 430 may retrieve a number of the most recent interactions 435 from the interaction database 455 in the memory 450. Similarities between the current context and the recent interactions 435 can be analyzed to determine one or more likely communication applications, recipients, or combinations of the two. For example, the recent interactions 435 can be organized into a plurality of clusters, where each cluster has a same set of contextual data. Then, a distance from the current contextual data to the clusters can be determined. A frequency and distance to the nearest clusters can be used to determine the most likely communication applications, recipients, or combinations of the two. Accordingly, a nearest neighbor algorithm, e.g., K Nearest Neighbors algorithm, may be executed to identify interactions that are nearest neighbors to the current context. Recipients and apps for a user to share with may be suggested based on probabilities of the recent interaction being similar to the current context.

Accordingly, interaction data for generating suggestions may be stored and retrieved from the interaction database 455. A pattern mining engine may operate on the interactions 435 to identify patterns (e.g., sets of items and that may be common to a number of interactions). Using the identified patterns, the pattern mining may generate rules and store the rules as interaction patterns 425. And, a second model can use only the most recent interactions (e.g., 100, 500, 1000, 2000, or more) to generate an on-demand model that determines similarities (distance) of the current context to those of recent interactions.

Suggestion engine 440 may be invoked when request 410 is received, e.g., from a response routine, such as response routine 210. Suggestion engine 240 may be invoked in other ways, e.g., from a selected communication application, which can occur in a different scenario. The request 410 can be received along with contextual data 415, e.g., obtained from context data sources 230 in FIG. 2. The reception of request 410 can trigger a prediction to be made to provide a suggested list of application, recipients, or a combination of both.

Preprocessing module 480 can receive the request 410 and any contextual data 415. Preprocessing module 480 can identify the types of data in the contextual data and perform any formatting or labeling for providing to pattern model 420 and dynamic model 430. For example, a model may require data to be provided in a particular order or format. Preprocessing module 480 can also determine which model(s) to use and which order to use them. Other models may also exist, e.g., as described herein. Preprocessing module 480 can determine a type of request and/or the requesting module (e.g., a sharing routine or a communication application) to determine which model to use and the parameters provided to those models (e.g., whether to suggest applications, recipient, or a combination of both). Further, preprocessing module 480 can trigger a data gathering module 485 to obtain additional contextual data 490, e.g., context data sources 250 as shown in FIG. 2. For example, the data gathering module 485 may obtain movement information from an inertial motion unit (IMU), time and date from a clock and calendar app, location from GPS or other location circuitry, proximity to devices of other users that are in the device's contact list, and previous applications used before the host application.

When a prediction is triggered, a matching routine 320 may compare the current device context specified in contextual data 415 to the patterns in the stored interaction patterns 425 to generate suggested recipients/apps, e.g., for a user to share a content object with. In response to the request trigger, the dynamic model 430 may generate an on-demand model (e.g., a cluster model) and then compare the current device context to recent interactions.

The machine learning module may generate the suggestion list 460 based on features derived by the feature engine 440 from the pattern model 420 and the dynamic model 430. The suggestion list 460 may be a list of possible suggestions for recipients or applications to share with, or both, ranked according to a probability that a user would select one of the suggestions in the list.

The machine learning module may generate an importance score for each rule using the set of features extracted from the rule. The importance score may be an indication of the importance of the rule in the current context for making a suggestion. Different rules may have the same app, recipient, or combination, but have different importance scores due to differences in the contextual data in the antecedent, and the importance scores can vary based on all of the current contextual data for a particular user request. Each rule may also have a confidence factor based a number of times the rule has been triggered. An overall importance score for rules including a same app, recipient, or combination may be determined by aggregating the importance score for those rules. The importance scores may be compared to a threshold value that may be a specified value, or may be a value that is dynamically tuned on the user device, e.g., a specified score, a percentage of a top score, within a top N scores, etc.

The user interface (UI) 470 of the device may display the final suggestion list 460, e.g., as a UI of a sharing routine. The final suggestion list 460 may be displayed in graphical form, for example using icons or photos to represent the suggested recipients and an icon to represent the suggested app. A highest ranking suggested recipient may be indicated by a prominently displayed photo or icon, for example, a larger photo or icon than other suggested recipients or simply by its position in an ordered list. Further details for such a UI are provided below.

A. Feature Engine

The resulting subset of rules matching the context that are identified by the pattern model 420 may lead to suggestions. Each identified rule might be pointing to a different suggestion; therefore, the rules in the subset may be ranked in terms of their importance or quality. The subset of rules can be input as features into the machine learning model 445 to generate a ranking, e.g., how important a rule would be in this context for this person to make the suggestion. The feature engine 440 may "featurize" each rule that matches the context at the time of the a sharing request, and the features may be input to the machine learning model 445. The machine learning model 445 may quantify a probability of a rule being useful in a given context and for a type of a user. The probability may be used as a scoring function to rank each rule.

The feature engine 440 may featurize the matching rules by extracting various defined characteristics from the rules. The feature engine 440 may extract characteristics of the rule, characteristics of the context, characteristics of rule and context matching, and characteristics of the person, among other characteristics. The characteristics extracted by the feature engine 440 may be converted to features, i.e., input, to the machine learning model 445.

The feature engine 440 may derive the features from the actual rules themselves as well as from user level characteristics. User level characteristics may be, for example, a number of shares, a number of messages, location, day of the week, etc. Every characteristic may not apply to every identified rule.

B. Machine Learning Model

Each rule identified by the pattern model 420 may be featurized and the features input into the machine learning model to determine an importance score for the rule. The importance score may be an indication of how important the rule would be for the user in the current context to make a suggestion. The machine learning model 445 may use gradient boosting decision trees to rank all the rules. Other embodiments may use different machine learning models, for example, but not limited to, neural networks, regression models, classification models, support vector machines (SVM), k-nearest neighbors (KNN), or other machine learning models. In some embodiments, the machine learning model may not be limited to one machine learning model. For example, a cascade of machine learning models (e.g., a forest of decision trees) may be used. A global machine learning model may be trained initially, and subsequent training may personalize the machine learning model for a specific user. Further details about training are provided in a following section.

Based on the features that are input to the machine learning model, different paths may be followed in the decision tree to arrive at an output. The tree does not change based on the input. For each rule containing different information, different features may be derived by the feature engine. The features being input into the decision tree may be all of the features from the list above that are applicable to a given rule. The different features input to the machine learning model may cause different paths in the decision tree to be followed to determine importance scores for the different rules. The features can be concatenated or input separately to the machine learning model. Different layers of the machine learning model can be used depending on the type of machine learning model used, e.g., convolutional layers or fully connected layers if a neural network is used.

Embodiments of the present disclosure may use gradient boosting decision trees as the machine learning model. The grading boosted decision trees a forest of trees, where each tree outputs an importance score and the importance scores can be averaged to determine an importance score for the rule. The output of the machine learning model can provide an importance score for each rule from which a suggest app can be extracted, or for apps themselves if they are output directly by the machine learning mode. A threshold may be applied, e.g., importance score exceeding 0.5 or another value, a specified number of rules or apps having highest importance scores, etc. In some cases, the threshold may be a dynamic threshold tuned on individual user devices. All rules or apps having an importance score meeting the threshold may be provided.

V. Training

The machine learning model may be trained using supervised learning. Data points may be collected from the user device when the device is idle, for example, overnight. Data for the previous 24 hours, or another time period, may be examined to determine any sharing behaviors having completed interactions, i.e., the user actually shared content with a recipient. The completed interactions provide knowledge of which rules were applicable in the sharing context, and which recipient and app was used in the sharing behavior. Supervised learning uses features (input) that produce the desired output (labels). In the case of the completed interactions, the recipient and app are used as the labels.

The completed user interactions, e.g., sharing behaviors, may be used as training data for the machine learning model. When a user shares content, the content will be shared with a selected recipient using a selected app for sharing. The recipient and/or app may be selected based on a suggestion displayed on the user interface of the mobile device, or may be selected based on other preferences of the user. The recipient and/or app selections made by the user may be tracked, as well as the context, for example, location, time of day, etc., related to the interaction. The tracked interactions can provide supervised training data.

When a user makes a selection of a recipient and/or app on the user interface, the completed sharing interaction may be stored in the interactions database (e.g., interactions database 455). The data for the completed interaction may include the context, the rules applied to make sharing suggestions, and the actual recipient and/or application for the interaction. During idle time of the mobile device, the rules that were applicable at the context of the completed sharing interaction may be evaluated to determine whether the recipient and/or app was predicted by the rule. All of the stored interactions (recommendations and rules) can be replayed and labeled (e.g., a successful yes/no binary label) for each of those rules depending on what their action was. Thus, every time a user takes an action, we go about labeling all of these behavioral rules are labeled with whether or not that rule was a positive recommendation to have been made or not.

Features may be derived from the rules, for example, by the feature engine 440. The machine learning model (e.g., machine learning model 445) may be trained using supervised learning with the derived features as input, and the recipient and app of the sharing behavior used as the labels (the desired outputs).

Each rule applicable at the time of a completed interaction may be checked, and the rule determined as correctly predicting the shared recipient and app. Conversely, a rule may be checked and determined as not correctly predicting the shared recipient and app. As a user continues to use a device, an increasing amount of label data may be obtained.

For every set of features extracted from a rule, the machine learning model may generate a probability for the rule. The probability may be compared to a threshold value. The threshold value may be a specified value, or may be a value that is dynamically tuned on the user device. For example, the threshold value may be set to 50%. When the probability for a given rule is greater than 50%, the rule crossed that threshold and may be a candidate for a suggestion. Suggestions extracted from the rules may be displayed in the UI ordered by their probabilities.

In some implementations, only suggestions for applications used to share with may be displayed. In other implementations, only a recipient or group of recipients to share with may be displayed. For example, when sending an email, all of the contacts in an autocomplete list may be ranked. The candidate pool for sharing may include all of the contacts on the user device, or all of the apps on the user device, or a combination of both. Since the UI has limited space for displaying the suggestions, suggestions having a probability of being selected greater than the threshold value, for example, greater than 50%, may be displayed in the available space.

Figure 5:
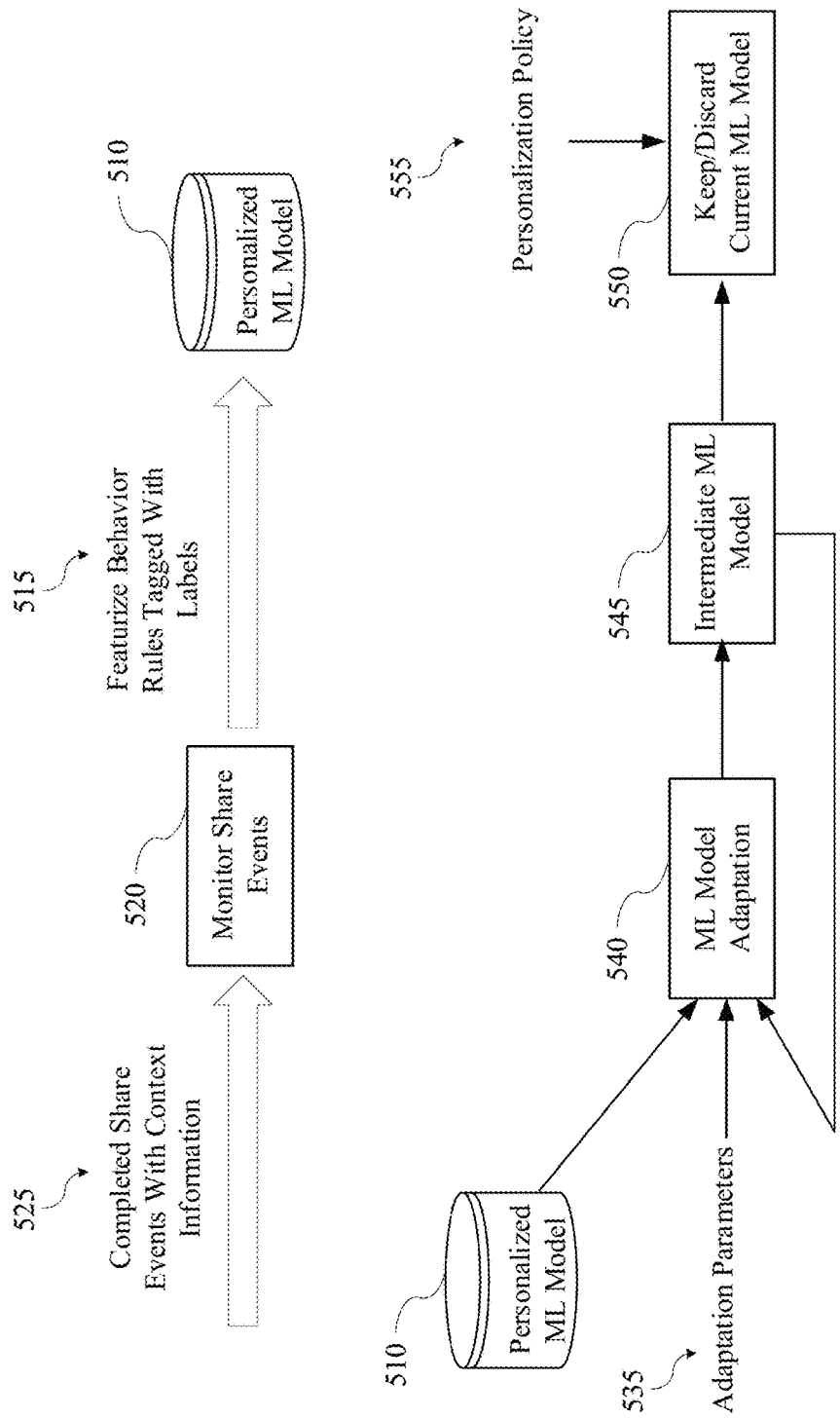
FIG. 5 is a diagram illustrating the process of training and adapting the machine learning model according to embodiments of the present disclosure.

FIG. 5 is a diagram illustrating the process of training and adapting the machine learning model according to embodiments of the present disclosure. A personalized machine learning model 510 is trained using featurized behavior rules tagged with suggestion quality labels 515 obtained by monitoring 520, completed share events including context information 525. The featurizing and labeling may be performed offline, for example, at night when the mobile device is idle.

The personalized machine learning model 510 may be continuously retrained, or adapted, based on data generated on an ongoing basis on individual user devices. Based on the specific user interactions that are completed, the user device may generate the same data, with the same rules from which the same features are derived, as well as the label. The features and labels derived from the user specific interactions can be used as adaptation parameters 535 to perform adaptation 540 on the current machine learning model on the device to generate an intermediate machine learning model 545. The current machine learning model may be an intermediate machine learning model 545, or the default model if an intermediate machine learning model has not yet been generated.

A personalization policy 550 may be implemented to determine whether a newly generated intermediate machine learning model should replace the current machine learning model or should be discarded 555. Thus, the default model initially serves suggestions for each user, but over time, as the model is adapted (retrained) with a specific user's data, the machine learning model becomes personalized to that user. The personalization policy 550 may describe, for example, the features that are used in the personalized machine learning model 510, the thresholds values used to make the final decision on the rules, dynamic tuning of the threshold values, as well as the configuration of the decision tree(s). Further, the personalization policy may enable pruning the decision trees, adding different decision trees into the forest, and/or deleting trees. The personalization policy 550 may operate in the background while the user is using their system select a best personalized machine learning model for the user.

VI. Personalization

The features extracted from the list of characteristics may be used personalize the machine learning model based on the contextual pieces that are important to a specific user. Machine learning-based solutions conventionally train one global model over a big dataset offline and deploy that global model to every user. The training process involves finding the best hyper-parameters and model parameters to optimize some criteria. The criteria are based on averaging a decision quality metric using a portion of the dataset that is being used for training. The machine learning training process results in a model is biased towards working well over the majority class in the dataset, but does not work well over the minority classes in the dataset. For example, a speech recognizer trained over a dataset that is representative of a population where a majority of persons are native English speakers will work most optimally for the majority class, but will work sub-optimally for non-native English speakers.

Embodiments of the present disclosure personalize the global machine learning model. On-device personalization specializes the global model with data generated on the particular user device using supervised learning. The supervised learning is performed using labels that are available or observable on the user device for continuous training. For a given user device, the recipient and app for the interactions completed by the user are available as the labels, and each rule applicable at the time of the completed interaction may be determined as correctly or incorrectly predicting the shared recipient and app.

Personalization of a machine learning model on a given user device involves performing continuous machine learning model adaptation on the user device. The adaptation operation is similar to training, but an existing machine learning model on the user device is updated with new data instances. Thus, a global machine learning model trained with data collected from a plurality and deployed with the user device can be personalized by continuous adaptation to the specific user of the device.

Figure 6:
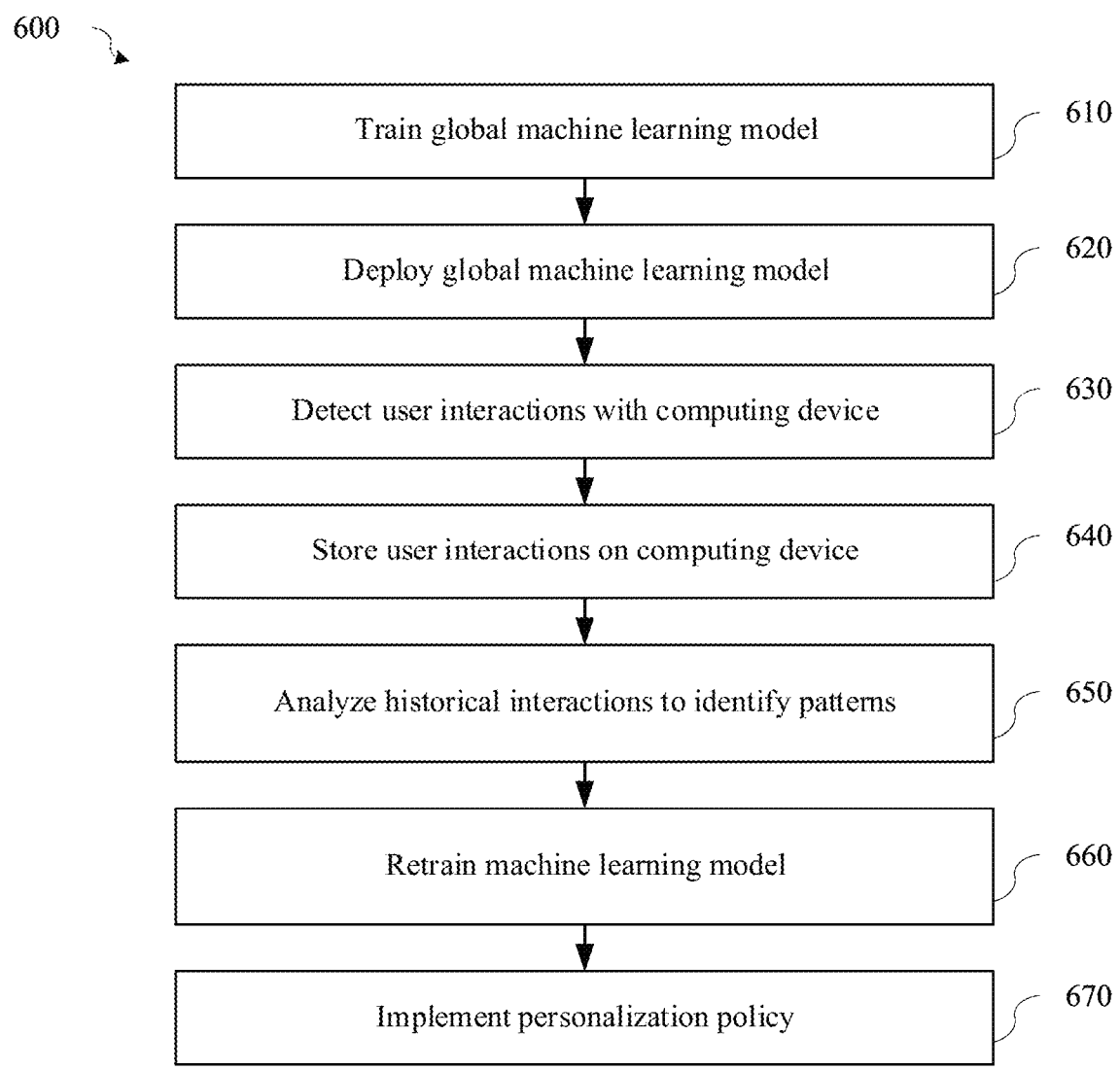
FIG. 6 is a diagram illustrating the process of training and adapting the machine learning model according to embodiments of the present disclosure.

FIG. 6 is a process of training and adapting the machine learning model according to embodiments of the present disclosure. At block 610, a global machine learning model may be trained. The global machine learning model may be trained using featurized behavior rules tagged with suggestion quality labels obtained by monitoring, from a plurality of users, completed share events including context information.

At block 620, the global machine learning model may then be deployed. The global machine learning model may be deployed to all user devices.

At block 630, user interactions with a computing device, for example a mobile phone or other mobile device, may be detected. A plurality of applications may be installed on the computing device, and interactions with any of the installed applications may be detected. Each detected user interaction may include a recipient, a communication application used to communicate with the recipient, and contextual data. The contextual data may include, for example, content type, interaction type, recency of interaction, temporal encodings, as well as other characteristics, e.g., as described herein.

At block 640, the detected user interactions may be stored on the computing device. Storing the interactions may create a database of historical user interactions. The database of historical user interactions may include historical recipients, historical communication applications, and historical contextual data. The historical database may have a finite size or time interval, e.g., 50,000 interactions or 3 months.

At block 650, the historical user interactions may be analyzed. Analyzing the historical user interactions may tune the predictions of recipients and apps to be more specific to the user's behavior based on their past behaviors. The historical user interactions may be periodically analyzed with a pattern mining technique (e.g., as described herein) to identify patterns in the historical user interactions. The analysis may be performed during idle time of the computing device, for example, overnight when the computing device is not being used. The historical user interactions may be analyzed daily, every several days, or on some other periodic schedule. All of the historical interactions stored in the database may be analyzed during the analysis.

As a result of analyzing the historical user interactions, a pattern model may be generated, e.g., including antecedent and consequent portions, as described herein. The pattern rules may be extracted from the interactions, and a pattern database may be generated and saved in the memory of the mobile device. For each of the possible criteria such as source, target, time of day, etc., the pattern database may include a list of the people and apps to suggest.

At block 660, the machine learning model may be retrained. After being deployed, the machine learning model may be continuously retrained, or adapted, based on the data generated on an ongoing basis on individual user devices.

Based on the specific user interactions that are completed, the user device may generate the same data, with the same rules from which the same features are derived, as well as the label. The features and labels derived from the user specific interactions can be used as adaptation parameters to perform adaptation on the current machine learning model on the device to generate an intermediate machine learning model. The current machine learning model may be an intermediate machine learning model, or the global model if an intermediate machine learning model has not yet been generated.

At block 670, a personalization policy may be implemented to determine whether a newly generated intermediate machine learning model should replace the current machine learning model or should be discarded. Thus, the global model initially serves suggestions for each user, but over time, as the model is adapted (retrained) with a specific user's data, the machine learning model becomes personalized to that user. The personalization policy may describe, for example, the features that are used in the personalized machine learning model, the thresholds values used to make the final decision on the rules, dynamic tuning of the threshold values, as well as the configuration of the decision tree(s). Further, the personalization policy may enable pruning the decision trees, adding different decision trees into the forest, and/or deleting trees. The personalization policy may operate in the background while the user is using their system select a best personalized machine learning model for the user.

VII. Example User Interface

The suggestion list may be displayed on a user interface (UI) of the mobile device. The list may be displayed in graphical form, for example using icons or photos to represent the suggested recipients and icons to represent the suggested app. Alternatively, the suggestion list may be displayed in a list form.

If the suggestion request was triggered via a response routine (e.g., 210), after receiving sets of suggested applications and/or suggested recipients from the suggestion engine, the sharing routine may provide a user interface to display the suggested applications and recipients, and to receive the user's selections of a particular application and/or recipient for sharing the content object. The user interface provided by the sharing routine may display a set of selectable components (e.g., icons) corresponding to the one or more suggested applications, and/or a set of selectable components corresponding to the one or more suggested recipients, e.g., photos of the person or other avatar or icon. The user interface may have a maximum number of selectable components display at an given time. The list may be scrollable or have a button for accessing an additional list. The selectable components may be selected from a display or from voice commands, e.g., from an audible list provided by a voice assistant.

Figure 7:
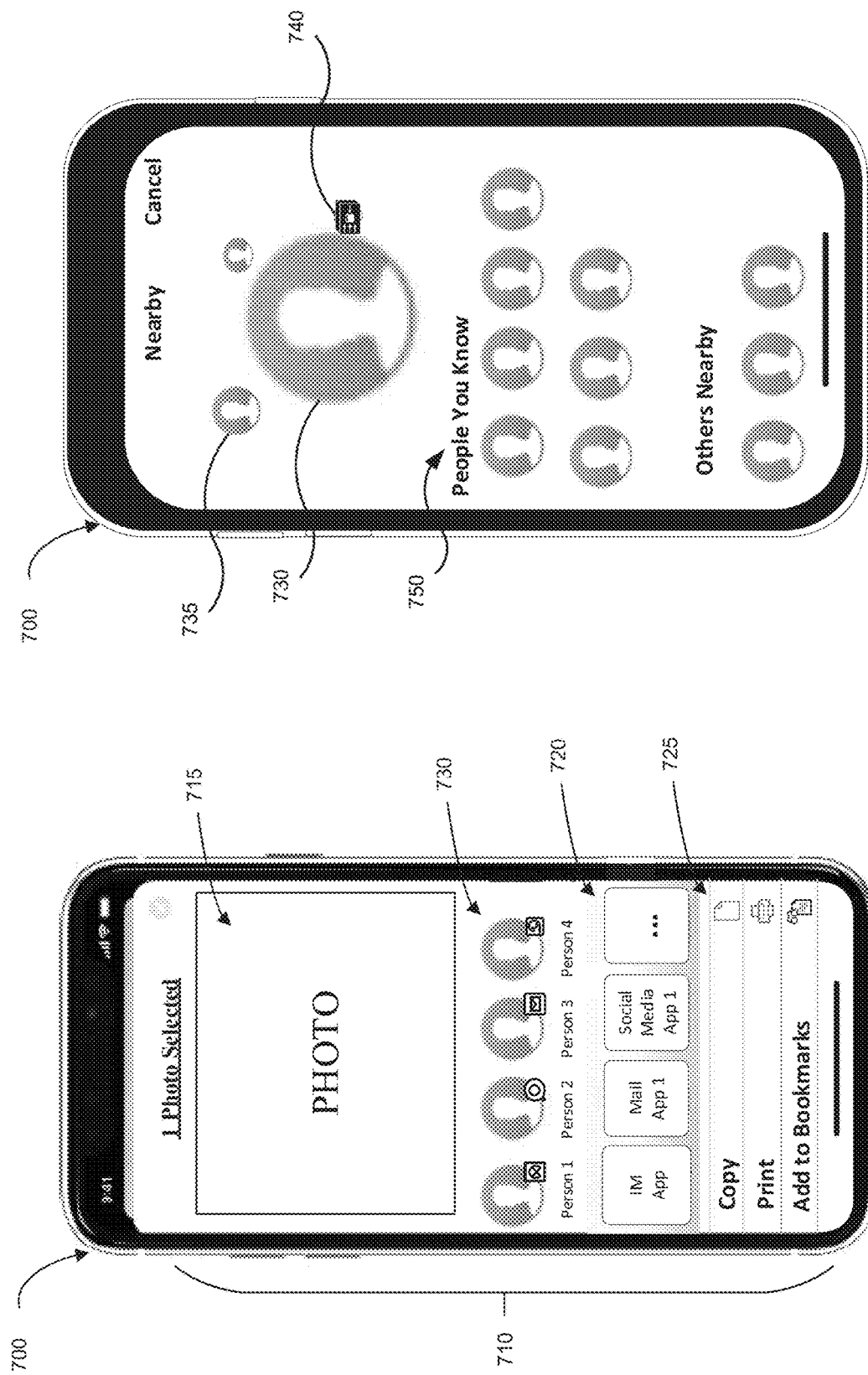
FIG. 7A shows a mobile device with a user interface displaying suggested applications and suggested application/recipients pairs according to embodiments of the present disclosure.
FIG. 7B shows a mobile device with a user interface displaying suggested recipients based on proximity according to embodiments of the present disclosure.

FIG. 7A shows a mobile device 700 with a user interface displaying suggested applications and suggested application/recipients pairs according to embodiments of the present disclosure. In this example, mobile device 700 can be executing a host application (e.g., in background) and display a window of a sharing routine, with a sharing routine user interface window 710 overlaying and partially or entirely obscuring the host application window.

User interface 710 indicates that the user of the mobile device 700 has selected a photo 715, from within the host application to be shared with one or more other applications, users, or devices. The host application may be any number of possible applications, such as photograph library applications, Internet browser applications, social media applications, etc. As noted above, the host application may provide a dedicated button, icon, or menu option to initiate the sharing user interface 710.

When the response routine (e.g., 210) is initiated by the host application (e.g., 205a), the sharing user interface 710 can display any one or more of: the content object 715 to be shared (e.g., for a photo or not display the content object, e.g., for a URL of a website), a user-selectable list of one or more possible applications 720 (example selectable components) that may be used to share the content object, and a list of additional capabilities 725 corresponding to other functions supported by the mobile device 700 for the content object (e.g., copy, print, add to bookmarks). Additionally, the sharing user interface window 710 may include a user-selectable list of suggested recipients 730 for sharing the content object, as other examples of selectable components. In this example, the user-selectable list of suggested recipients 730 includes recipient-application combinations, as a small app icon is displayed in combination with each recipient. The recipients may also be displayed without an associated application.

User selections on the user interface may be tracked to provide supervised training data for the machine learning model. When a user shares content, the recipient and/or app may be selected based on a suggestion displayed on the user interface of the mobile device, or may be selected based on other preferences of the user. The recipient and/or app selections made by the user may be tracked, as well as the context, for example, location, time of day, etc., related to the interaction. The tracked interactions can provide features and labels for the supervised training data.

Although individual user faces are not shown in the example interface of FIG. 7A, in certain embodiments the sharing routine may be configured to look-up each of the received recipients in one or more data sources (e.g., the user's contacts list, phone book, social media contacts list, etc.) and may retrieve additional data such as an image of the recipient, nickname, or other personal data, which then may be incorporated in the recipient suggestion list 730 of the sharing user interface 710.

The sharing routine then may receive user selections of one or more applications to be used for sharing the content object and/or one or more recipients with whom the content object is to be shared. For example, the user may select one of the specified applications 720 with which to share the content object 715, or may select the ellipsis to view and select additional applications. Alternatively, the user may select one of the specified recipient-application combinations 730.

It should be understood that the suggested sets of applications 720, and the suggested recipient-application combinations 730, may correspond to the suggestions determined by the suggestion engine (e.g., 240) using the techniques discussed above, and returned to the sharing routine. The suggestions may include likelihood (probability) values that specify how the suggestions should be ordered (e.g., for each of the two lists). Alternatively, the suggestions can be sent in the order that they are to be displayed.

Accordingly, the sharing routine may rank, filter, and/or customize the suggestion results received from the suggestion engine, prior to displaying them via the sharing user interface. For example, after receiving back the application and/or recipient suggestions, the sharing routine may filter out any suggested applications that have recently been removed from the device or filter out applications that are not supported for sending a selected content object. The ranking or customization of the suggested applications and recipients may be based on the preferences/configurations of the device, user preferences, host application, and/or target application (i.e., the application used to share the content object). For instance, the total number of application or recipient suggestions may be limited by the form factor of the mobile device 700. Additionally, in some embodiments, users, host applications, and/or target applications may provide preferences for particular content objects, particular recipients, particular counterpart applications, including preference rankings and/or blacklists which may override the suggestions from the suggestion engine to prevent display of a particular recipient and/or application, based on the user, content type, host application, and/or other context data.

In another example, the sharing routine may implement a technique for promoting newly installed target applications on the mobile device 700. For instance, even though a new application recently installed on the mobile device 700 is unlikely to be suggested by the modeling of the suggestion engine, due to a lack of previous interaction data, the sharing routine may override the suggestions to include the new application in the suggested application list 720 as a way of encouraging the user to try the newly installed application.

In some embodiments, proximity information may be used to determine where a suggested recipient is displayed on a screen. As described above, proximity to other devices may be measured using ranging signals (e.g., UWB), e.g., to measure time of flight between the devices. Device 700 may include multiple antennas (e.g., 3) that can allow a determination of an angle to the other device. This spatial information can be used to point mobile device 700 at a second device, and mobile device 700 can determine a location of that second device in a radial and 360 degree perimeter around mobile device 700.

FIG. 7B shows a mobile device 700 with a user interface displaying suggested recipients based on proximity according to embodiments of the present disclosure. Mobile device 700 can determine which recipient device is directly in front of mobile device 700 and at a close range, and thus it is likely device 700 is being pointed at the recipient device. In such a situation, the recipient associated with that recipient device can be displayed as a selectable component 730, e.g., as a photo or an icon, that is larger than other suggested recipient. Other recipients can be displayed as smaller components (e.g., 735). The display of other recipients can be based on an angular relationship to mobile device 700, e.g., recipient 735 would be to the front-left of mobile device 700. The display of the highest ranking suggested recipient may also include a smaller icon 740 indicated the suggested app. Other suggested recipients 750 may be displayed in rank order elsewhere on the user interface.

VIII. Example Method Using Patterns and Machine Learning

Figure 8:
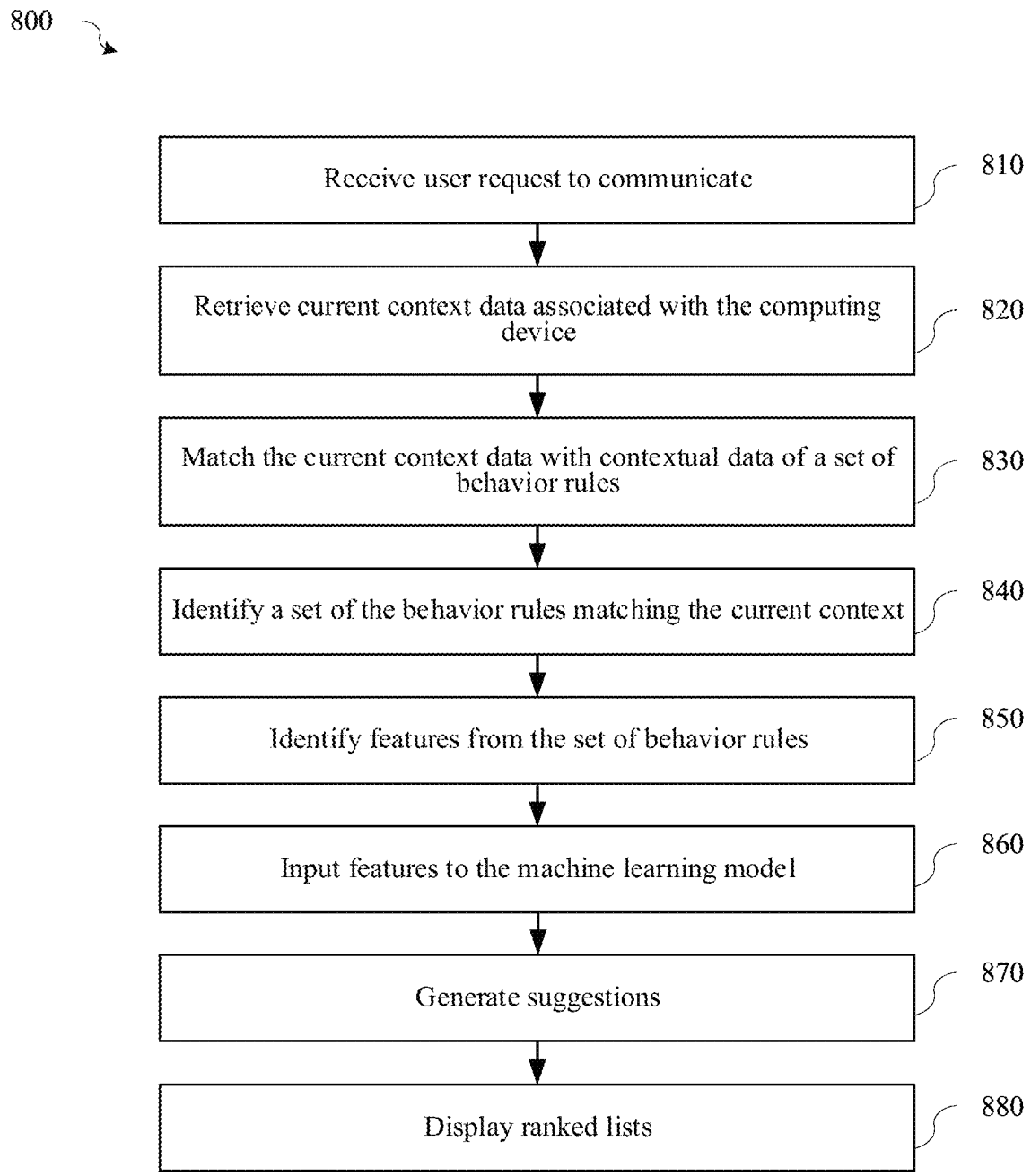
FIG. 8 is a flowchart illustrating a method for suggesting recipients and applications according to embodiments of the present disclosure.

FIG. 8 is a flowchart illustrating a method 800 for suggesting recipients and applications according to embodiments of the present disclosure. Method 800 can be used for suggestions in a variety of contexts, e.g., when a communication application has not been selected or when a communication application has already been selected. The operations of FIG. 8 can evaluate a current context of a computing device (e.g., a mobile device) using patterns of interactions, which can be mined periodically. A current context can also be used to identify recent interactions that are similar. Additionally, heuristics can be used. Thus, results from multiple models can be used and combined. The combined results may be featurized to provide input to a machine learning model, and the output of the machine learning model may rank suggestions to be provided to a user. The machine learning model may be periodically adapted with data obtained from the user device to provide suggestion that are personalized to the specific user. Although described for use with application/recipient pairs, method 800 may also be used for either one independently, e.g., to provide suggestions just for recipients or just for communication applications.

At block 810, a user request may be received. For example, the user may initiate a sharing operation by, for example, selecting a button on a UI, such as for a sharing routine or other button configured to initiate a sharing operation. Thus, the user request can be received while a host application is being displayed on a window of the computing device, where the user request is to share a content object. As another option a user could provide a voice command. Another example is a user providing a command (e.g., touch or voice) to start a specific communication application or just to communicate in general. In this manner, the device can interpret various user requests as an indicate that a communication is about to occur.

At block 820, in response to receiving the user request, the current context data associated with the computing device may be retrieved. For example, when the user request is retrieved (e.g., initiation of a sharing operation), the current context of the computing device may be captured. Examples of contextual data are provided throughout the disclosure, e.g., with respect to FIG. 4. Various hardware and software components can be used to provide the contextual data. In various embodiments, the captured current context data may be stored previous to receiving the request and then retrieved at the time of the request or dynamically determined and sent directly to a sharing routine or suggestion engine.

At block 830, the current context data may be matched with contextual data of a set of behavior rules. The behavior (pattern) rules may be extracted from the historical interactions. When a prediction is triggered, relevant behavior rules may be filtered with a matching routine. The matching routine may include an antecedent filter and a consequent filter, and may filter the behavior rules based on current context data from the mobile device. Further description of matching is provided in sections III.B above.

At block 840, a set of the behavior rules having contextual data that match the current context data may be identified. Not all of the behavior rules extracted from the historical interactions may be relevant to the current context. For example, not all of the behavior rules may include a sharing behavior even though other aspects of the context, e.g., time of day, day of the week, etc., may match. The relevant set of behavior rules may also have contexts that include sharing behaviors.

At block 850, a set of features may be identified from the set of the behavior rules. The behavior rules may be determined by the matching routine (e.g., matching routine 320) as described in section III, and the features may be derived from the rules by the feature generation module (e.g., feature generation module 360) as described in section III.C. The resulting subset of rules that are identified may lead to suggestions. Each identified rule might be pointing to a different suggestion for a recipient and/or a sharing app. Each rule that matches the context at the time of the a sharing request may be "featurized" by extracting various defined characteristics from the rules. The extracted characteristics may include characteristics of the rule, characteristics of the context, characteristics of rule and context matching, and characteristics of the person, among other characteristics. The extracted characteristics may be converted to features for the machine learning model.

At block 860, the set of features may be input to the machine learning model. The features from each rule may be input into the machine learning model to determine an importance score for the rule. In cases where the features can be described as binary values, a feature vector for each rule can be input as a bit vector. Each rule may be evaluated independently by the machine learning model to generate an importance score for each rule. Alternatively, the sets of features from the identified set of the behavior rules may be input to the machine learning model together to generate an importance score for the combination of rules. The machine learning model may use gradient boosting decision trees to rank all the rules. A global machine learning model may be trained initially, and subsequent training may personalize the machine learning model for a specific user.

At block 870, the machine learning model may generate suggestions. For every set of features extracted from a rule, the machine learning model may generate an importance score for that rule. The importance score may be an indication of how important the rule would be for the user in the current context to make a suggestion. In some embodiments, different rules may have the same app, recipient, or combination, but different contextual data, resulting in a different importance score. Further, each rule can have a confidence factor based a number of times the rule has been triggered. The confidence factor can act as a multiplicative factor that multiplies the importance score determined for the rule to obtain an adjusted importance score. An overall, or aggregated, importance score for rules including a same app, recipient, or combination may be determined. The importance scores of rules that include the same app, recipient, or combination (depending on what is being predicted) can be summed to determine the aggregated importance score.

The aggregated importance scores may be compared to a threshold value. The threshold value may be a specified value, or may be a value that is dynamically tuned on the user device. When the aggregated importance score of a rule exceeds the threshold, the consequent of the rule may include an app, recipient, or combination that may be a candidate for a suggestion. For example, the aggregated importance score threshold value may be set to 0.5. Rules having an aggregated importance score meeting the threshold may contain apps, recipients, or combinations that may be candidates for a suggestions.

In some embodiments, the machine learning model may output a ranked list of rules according to the importance score of each rule. Aggregated importance scores may be determined as described above, and an app, recipient, or combination may be extracted from a specified number of rules having highest importance scores to provide suggestions. In other embodiments, the aggregation of importance scores and extraction of app, recipient, or combination may be may be performed by the machine learning model and output directly as suggestions without outputting a ranked list of rules. In such cases, the importance scores may be determined for the app, recipient, or combination rather than for the rules.

At block 880, the suggestions may be displayed on the user interface of the user device. A first communication application and recipient pair from the first ranked list and a second communication application and recipient pair from the second ranked list may be displayed. A user interface configured to display a plurality of selectable components may be provided. The selectable components may include the first communication application and recipient pair from the first ranked list and the second communication application and recipient pair from the second ranked list. FIGS. 7A and 7B provide examples. For example, in FIG. 7B, each of the plurality of selectable components is displayed as an aggregate icon that combines a first icon of the communication application and a second icon of the recipient, as shown in recipient-application combinations 730.

In some examples, the first communication application and the second communication application are a same communication application that has already been selected. For instance, a nearby wireless communication protocol may be selected, and a recipient can be suggested, thereby providing a suggested pair of the wireless protocol and a recipient. As another example, a messaging or communication application may be selected using a touch screen or a voice command.

VII. Example Device

Figure 9:
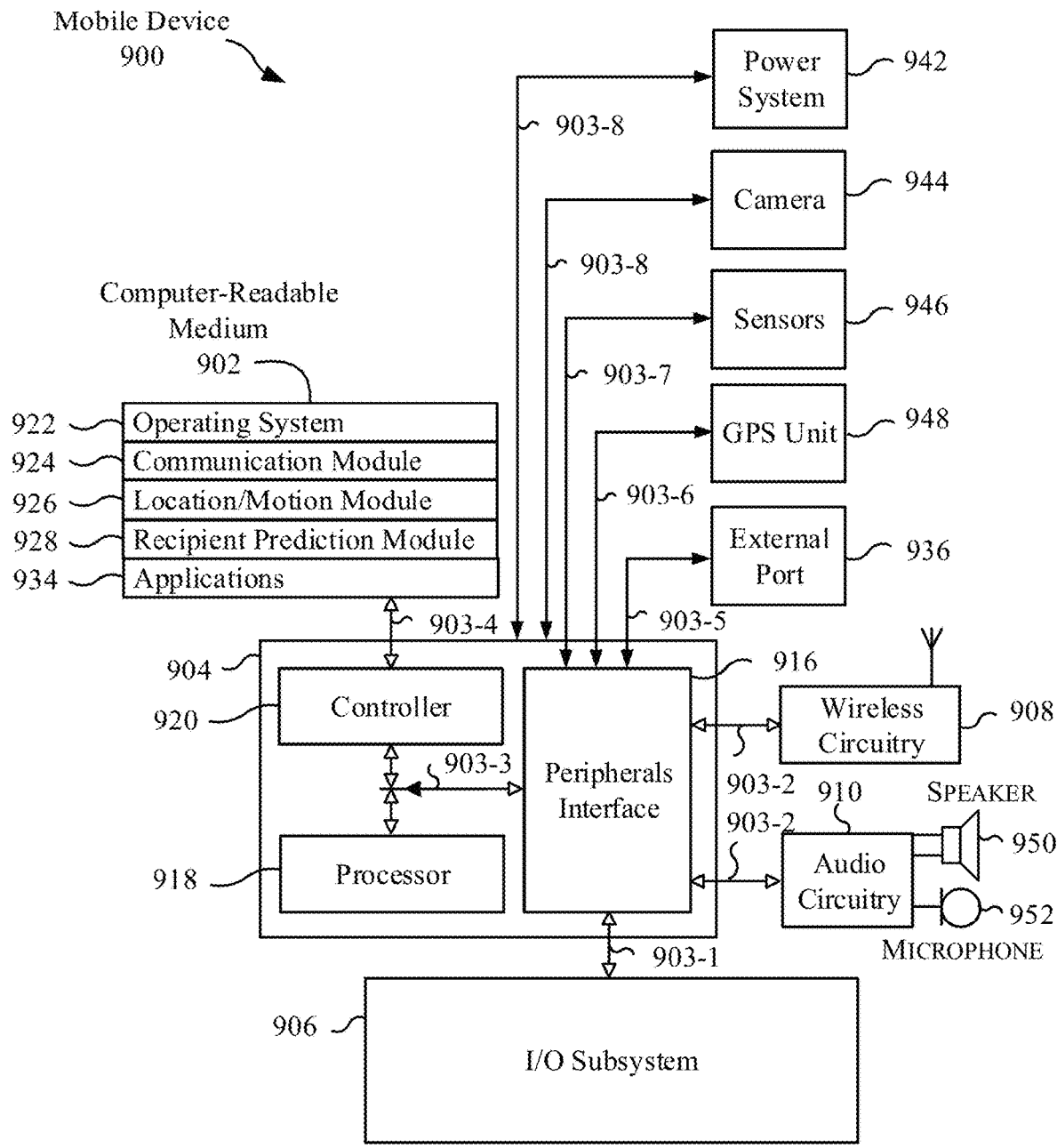
FIG. 9 is a block diagram of an example device according to aspects of the present disclosure.

FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a vehicle display device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a recipient suggestion module (or set of instructions) 928, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, a plurality of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Recipient suggestion module 928 can include various sub-modules or systems. Recipient suggestion module 928 can perform all or part of the method 800.

The one or more applications 934 on the mobile device can include any applications installed on the device 900, including without limitation, a browser, an address book, a contact list, email, instant messaging, video conferencing, video calling, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user.

The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a plurality of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve prediction of users that a user may be interested in communicating with. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to predict users that a user may want to communicate with at a certain time and place. Accordingly, use of such personal information data included in contextual information enables people centric prediction of people a user may want to interact with at a certain time and place. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of people centric prediction services, the present technology can be configured to allow users to select to "opt in" or "opt out" of participation in the collection of personal information data during registration for services or anytime thereafter. In another example, users can select not to provide location information for recipient suggestion services. In yet another example, users can select to not provide precise location information, but permit the transfer of location zone information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users that a user may want to communicate with at a certain time and place may be predicted based on non-personal information data or a bare minimum amount of personal information, such as the content being requested by the device associated with a user, other non-personal information, or publicly available information.

Although the invention has been described with respect to specific embodiments, it will be appreciated that the invention is intended to cover all modifications and equivalents within the scope of the following claims.

What is claimed is:

1. A method comprising performing by a computing device:
   receiving a user request;
   in response to the user request, retrieving current context data associated with the computing device;
   matching the current context data with behavior rules, the behavior rules determined from user interactions with a plurality of applications installed on the computing device, wherein each of at least a portion of the user interactions include (i) contextual data and (ii) an application used or a recipient;
   identify a set of the behavior rules having contextual data that match the current context data;
   determining a set of features from the set of the behavior rules;
   inputting the set of features to a machine learning model;
   generating, by the machine learning model, one or more suggestions for an application or a recipient; and
   providing a user interface configured to display a plurality of selectable components that include the one or more suggestions.

2. The method of claim 1, wherein determining the set of features comprises:
   using binary inquiries to determine whether a particular piece of contextual data exists in a rule.

3. The method of claim 1, further comprising:
   tracking a user selection of one of the one or more suggestions;
   storing an indication of whether each of the one or more suggestions was selected or not selected as training data for the machine learning model; and
   training the machine learning model using the training data.

4. The method of claim 1, wherein generating the one or more suggestions for an application or recipient comprises:
   determining, by the machine learning model, importance scores for each rule of the set of the behavior rules;
   outputting, by the machine learning model, the set of the behavior rules ranked according to the importance scores; and
   extracting application or recipient suggestions from a subset of the behavior rules having importance scores that exceed a threshold importance value.

5. The method of claim 4, wherein determining the importance scores comprises aggregating the importance scores for a plurality the set of the behavior rules containing a same application or recipient to generate an aggregated importance score.

6. The method of claim 1, wherein generating the one or more suggestions for an application or recipient comprises:
   extracting, by the machine learning model, applications or recipients contained in each rule of the set of the behavior rules;
   determining, by the machine learning model, importance scores for each application or recipient; and
   outputting, by the machine learning model, a set of suggestions for applications or recipients having importance scores that exceed a threshold importance value.

7. The method of claim 6, wherein determining the importance scores comprises aggregating the importance scores for a plurality of same applications or recipients to generate aggregated importance scores for the applications or recipients.

8. The method of claim 6, wherein a user request comprises selecting an object on a screen of the computing device, a voice command to the computing device, unlocking the computing device, or pointing the computing device in a direction.

9. A mobile device, comprising:
a memory configured to store processor-executable instructions; and
one or more processors configured for executing the instructions stored in the memory, the instructions being executable for causing the one or more processors to perform operations comprising:
receiving a user request;
in response to the user request, retrieving current context data associated with the mobile device;
matching the current context data with behavior rules, the behavior rules determined from user interactions with a plurality of applications installed on the mobile device, wherein each of at least a portion of the user interactions include (i) contextual data and (ii) an application used or a recipient;
identify a set of the behavior rules having contextual data that match the current context data;
determining a set of features from the set of the behavior rules;
inputting the set of features to a machine learning model;
generating, by the machine learning model, one or more suggestions for an application or a recipient; and
providing a user interface configured to display a plurality of selectable components that include the one or more suggestions.

10. The mobile device of claim 9, wherein the one or more processors are further configured for executing the instructions stored in the memory to perform operations for determining the set of features including:
using binary inquiries to determine whether a particular piece of contextual data exists in a rule.

11. The mobile device of claim 9, wherein the one or more processors are further configured for executing the instructions stored in the memory to perform operations including:
tracking a user selection of one of the one or more suggestions;
storing an indication of whether each of the one or more suggestions was selected or not selected as training data for the machine learning model; and
training the machine learning model using the training data.

12. The mobile device of claim 9, wherein the one or more processors are further configured for executing the instructions stored in the memory to perform operations including:
determining, by the machine learning model, importance scores for each rule of the set of the behavior rules;
outputting, by the machine learning model, the set of the behavior rules ranked according to the importance scores; and
extracting application or recipient suggestions from a subset of the behavior rules having importance scores that exceed a threshold importance value.

13. The mobile device of claim 12, wherein the one or more processors are further configured for executing the instructions stored in the memory to perform operations for determining the importance scores including:
aggregating the importance scores for a plurality the set of the behavior rules containing a same application or recipient to generate an aggregated importance score.

14. The mobile device of claim 9, wherein the one or more processors are further configured for executing the instructions stored in the memory to perform operations for generating the one or more suggestions for an application or a recipient including:
extracting, by the machine learning model, applications or recipients contained in each rule of the set of the behavior rules;
determining, by the machine learning model, importance scores for each application or recipient;
aggregating the importance scores for a plurality of same applications or recipients to generate aggregated importance scores for the applications or recipients; and
outputting, by the machine learning model, a set of suggestions for applications or recipients having importance scores that exceed a threshold importance value.

15. The mobile device of claim 9, wherein the user request comprises selecting an object on a screen of a mobile device, a voice command to the mobile device, unlocking the mobile device, or pointing the mobile device in a direction.

16. A non-transitory computer readable medium having stored thereon instructions for causing one or more processors of a mobile device to perform operations comprising:
receiving a user request;
in response to the user request, retrieving current context data associated with the mobile device;
matching the current context data with behavior rules, the behavior rules determined from user interactions with a plurality of applications installed on the mobile device, wherein each of at least a portion of the user interactions include (i) contextual data and (ii) an application used or a recipient;
identify a set of the behavior rules having contextual data that match the current context data;
determining a set of features from the set of the behavior rules;
inputting the set of features to a machine learning model;
generating, by the machine learning model, one or more suggestions for an application or a recipient; and
providing a user interface configured to display a plurality of selectable components that include the one or more suggestions.

17. The non-transitory computer readable medium as defined in claim 16, further comprising instructions to perform operations for determining the set of features including:
using binary inquiries to determine whether a particular piece of contextual data exists in a rule.

18. The non-transitory computer readable medium as defined in claim 16, further comprising instructions to perform operations including:
tracking a user selection of one of the one or more suggestions;
storing an indication of whether each of the one or more suggestions was selected or not selected as training data for the machine learning model; and
training the machine learning model using the training data.

19. The non-transitory computer readable medium as defined in claim 16, further comprising instructions to perform operations including:
determining, by the machine learning model, importance scores for each rule of the set of the behavior rules;
aggregating the importance scores for a plurality of same applications or recipients to generate aggregated importance scores for the applications or recipients;
outputting, by the machine learning model, the set of the behavior rules ranked according to the importance scores; and extracting application or recipient suggestions from a subset of the behavior rules having importance scores that exceed a threshold importance value.

20. The non-transitory computer readable medium as defined in claim 16, further comprising instructions to perform operations for generating the one or more suggestions for an application or recipient including:
- extracting, by the machine learning model, applications or recipients contained in each rule of the set of the behavior rules;
- determining, by the machine learning model, importance scores for each application or recipient;
- aggregating the importance scores for a plurality of same applications or recipients to generate aggregated importance scores for the applications or recipients; and
- outputting, by the machine learning model, a set of suggestions for applications or recipients having importance scores that exceed a threshold importance value.

\* \* \* \* \*